(12) United States Patent
Burchard

(10) Patent No.: US 12,086,692 B2
(45) Date of Patent: Sep. 10, 2024

(54) DEVICES AND METHOD FOR MONITORING A QUANTUM COMPUTER IN OPERATION

(71) Applicant: QUANTUM TECHNOLOGIES GmbH, Leipzig (DE)

(72) Inventor: Bernd Burchard, Essen (DE)

(73) Assignee: Quantum Technologies GMBH, Leipzig (DE)

( * ) Notice: Subject to any disclaimer, the term of this patent is extended or adjusted under 35 U.S.C. 154(b) by 0 days.

(21) Appl. No.: 18/556,884

(22) PCT Filed: Apr. 21, 2022

(86) PCT No.: PCT/DE2022/100301
§ 371 (c)(1),
(2) Date: Oct. 23, 2023

(87) PCT Pub. No.: WO2022/228613
PCT Pub. Date: Nov. 3, 2022

(65) Prior Publication Data
US 2024/0220845 A1    Jul. 4, 2024

(30) Foreign Application Priority Data

Apr. 28, 2021    (DE) .................. 102021110964.7

(51) Int. Cl.
*G06N 10/70*    (2022.01)
*G06N 10/80*    (2022.01)

(52) U.S. Cl.
CPC ............. *G06N 10/70* (2022.01); *G06N 10/80* (2022.01)

(58) Field of Classification Search
CPC .............................. G06N 10/70; G06N 10/80
See application file for complete search history.

(56) References Cited

U.S. PATENT DOCUMENTS

2014/0025926 A1*  1/2014  Yao ................. G06F 15/78
                                         712/32
2019/0325337 A1* 10/2019  Reilly .................... G06N 10/00

FOREIGN PATENT DOCUMENTS

DE        10036278 A1     2/2002
WO     2021083448 A1     5/2021

OTHER PUBLICATIONS

International Preliminary Report on Patentability issued by the International Bureau in corresponding application PCT/DE2022/100301 on Jul. 10, 2023.

(Continued)

*Primary Examiner* — Jigar P Patel
(74) *Attorney, Agent, or Firm* — Michael J. McCandlish; Mindful IP Law

(57) ABSTRACT

A quantum computer system includes a quantum computer and a quantum computer monitoring device. The quantum computer runs a quantum computer program with a quantum computer program flow. The quantum computer monitoring device monitors the correct quantum computer program flow of the quantum computer program of the quantum computer. The quantum computer monitoring device is arranged to detect hardware and/or software errors that occur during operation. A method includes monitoring the operation of the quantum computer by a quantum computer monitoring device to detect hardware and/or software errors that occur during operation.

8 Claims, 4 Drawing Sheets

(56) References Cited

OTHER PUBLICATIONS

Alexander Robert S. Smith et al. "A Practical Quantum Instruction Set Architecture," arxiv.org, Feb. 17, 2017 (Feb. 17, 2017), Retrieved from the internet: https://arxiv.org/pdf/1608.03355.pdf [retrieved on Feb. 12, 2019] xp055555269, p. 1-p. 14, left-hand column, last paragraph.
Anonymous, "Intel 'Horse Ridge' Addresses key barriers to quantum scalability," Feb. 18, 2020 (Feb. 18, 2020) Retrieved from the internet: https://newsroom.intel.com/wp-content/uploads/sites/11/2020/02/intel-ISSCC-Horse-Ridge-Fact-Sheet.pdf [retrieved on Aug. 24, 2022] XP055954525.
Colm A Ryan et al., "Hardware for Dynamic Quantum Computing," arxiv.org, Cornell University Library, 201 Olin Library Cornell University Ithaca, NY 14853, Apr. 26, 2017 (Apr. 26, 2017), DOI: 10.1063/1.5006525, XP081275840.
Fu X et al, "eQasm: An Executable Quantum Instruction Set Architecture," Mar. 9, 2019 (Mar. 9, 2019), Retrieved from the internet: http://arxiv.org/pdf/1808.02449.pdf [retrieved on Feb. 18, 2021, XP055777651, p. 1-p. 13, left hand column, paragraph 5.
Yilun Xu et al., "QubiC: An open source FPGA-based control and measurement system for superconducting quantum information processors," arxiv.org, Cornell University Library, 201 Olin Library Cornell University, Ithaca, NY 14853, Dec. 31, 2020 (Dec. 31, 2020), XP081849939.

\* cited by examiner

DEVICES AND METHOD FOR MONITORING A QUANTUM COMPUTER IN OPERATION

CROSS-REFERENCE TO RELATED APPLICATIONS

This application is a US National Phase of International Patent Application Number PCT/DE2022/100301, filed Apr. 21, 2022, claiming priority to German Patent Application DE 10 2021 110 964.7 filed Apr. 28, 2021, the contents of both of which are incorporated by reference in their entireties into the subject matter of the present application.

TECHNICAL FIELD

The disclosure is directed to devices and methods for monitoring a quantum computer in operation. Here, the focus is on a quantum computer based on paramagnetic centers. Paramagnetic centers in diamond are particularly preferred. Particularly preferably, one or more of the paramagnetic centers is one or more of the following centers in diamond: NV, SiV, TiV, GeV, SnV, $NiN_4$, PbV, ST1, L1. In the document presented here, the focus is on quantum computers based on NV centers in diamond. Persons skilled in the art consider any combination of the above paramagnetic centers as possible realizations. In this context, the document presented here refers, for example, to the document WO 2021 083 448 A1. To the extent permitted by the law of any state in which the document presented here is to be nationalized, the technical teaching of WO 2021 083 448 A1 is fully incorporated in the disclosure of the document presented here.

BACKGROUND

When discussing potential applications of quantum computers, the question arises from time to time as to whether quantum computers may be used in such a way that they reliably provide the expected results. In principle, quantum computers are systems that only provide predetermined results with a certain probability. In this respect, they already differ significantly in their basic reliability.

However, this is not about error correction of quantum computers. Instead, it is about SIL (Safety Integrity Level) compliant prevention of unauthorized and possibly even dangerous states of systems controlled by quantum computers. For this purpose, it must be possible to recognize errors in the quantum systems that may occur during operation. The systems controlled by such quantum computers must be prevented from entering unsafe states.

The document presented here refers to the international patent application WO 2021 083 448 A1, which was still unpublished at the time of filing the priority patent application DE 10 2021 110 964.7 of Apr. 28, 2021. To the extent permitted by the law of any state in which the document presented here is to be nationalized, the technical teaching of WO 2021 083 448 A1 is fully incorporated in the disclosure of the document presented here.

SUMMARY

The task according to the disclosure is therefore to provide a solution that does not have the above disadvantages of the prior art and has other advantages.

This task is solved by devices and methods according to the independent claims. Further examples are the subject of dependent claims.

The technical teaching of the document presented here proposes a quantum computer system (QUSYS) with a quantum computer (QC) and a quantum computer monitoring device (QUV). The quantum computer (QC) preferably comprises a plurality of quantum dots along with first means. The first means may preferably manipulate one or more quantum dots of the quantum computer (QC) and thus modify their quantum states. In the sense of this document, the quantum dots may be, for example, paramagnetic centers, for example NV centers in diamond and/or nuclear spins, for example $^{13}C$ isotopes in a $^{12}C$ diamond matrix. In this context, the document presented here refers, for example, to the document WO 2021 083 448 A1. To the extent permitted by the law of any state in which the document presented here is to be nationalized, the technical teaching of WO 2021 083 448 A1 is fully incorporated in the disclosure of the document presented here. However, nuclear quantum dots (nuclear qubits) are explicitly included in the term quantum dot in the sense of the document presented here. The first means may couple, in particular entangle, quantum dots of the quantum computer to each other, which are at least a subset of the quantum dots of the quantum computer (QC). The quantum computer (QC) executes a quantum computer program having a quantum computer program flow. The quantum computer (QC) preferably comprises a control computer (μC) having a memory (MEM). Typically, the control computer (μC) forms a von-Neumann or Harvard-architecture with the memory. The control computer (μC) may preferably control said first means of the quantum computer (QC). The quantum computer program is preferably a command sequence of quantum computer codes for the control computer (μC), wherein the quantum computer program codes each individually encodes or represents one or more operations of the control computer (μC). Here, at least one quantum computer program code represents one quantum operation. Typically, several different quantum computer codes represent a plurality of different quantum operations. Typically, a plurality of other quantum computer program codes represents operations that are not quantum computer operations of the control computer (μC). The set of quantum computer program codes in the memory (MEM) of the control computers (μC) of the quantum computer forms the quantum computer program of the quantum computer (QC).

The first means of the quantum computer (QC) are preferably suitable for establishing and/or manipulating a superposition of quantum states of one or more quantum bits of the quantum computer (QC).

The first means of the quantum computer (QC) are preferably suitable for setting a predetermined quantum state of one or more quantum bits of the quantum computer (QC).

The first means of the quantum computer (QC) are preferably suitable for setting a predetermined superimposition of a plurality of predetermined quantum states of one or more quantum bits of the quantum computer (QC).

The first means of the quantum computer (QC) are preferably suitable for setting a predetermined entanglement of a plurality of predetermined quantum states of one or more quantum bits of the quantum computer (QC).

The quantum computer (QC) preferably has second means for determining and/or reading out a quantum state of one or more quantum bits of the quantum computer (QC).

Preferably, the quantum bits include paramagnetic centers in diamond. Preferably, these paramagnetic centers include NV-centers and/or SiV-centers and/or TR1-centers and/or L1-centers and/or TiV-centers and/or GeV-centers and/or SnV-centers and/or $NiN_4$-centers and/or PbV-centers and/or ST1-centers etc. In this case, NV-centers are particularly suitable.

Preferably, the quantum bits include nuclear quantum bits that include isotopes with a magnetic moment. In this context, the document presented here refers, for example, to the document WO2021083448A1. To the extent permitted by the law of any state in which the document presented here is to be nationalized, the technical teaching of WO2021083448A1 is fully incorporated in the disclosure of the document presented here. For example, the nuclear quantum dots may be $^{13}C$-isotopes and/or $^{14}N$-isotopes and/or $^{15}N$-isotopes within the diamond material.

The first means preferably comprise one or more electrical lines which may manipulate the quantum states of the quantum bits by means of magnetic, electrical and/or electromagnetic fields. The first means preferably also include means for driving these lines. The first means may include arbitrary waveform generators (AWG), for example. In this context, the document presented here refers, for example, to the document WO2021083448A1. To the extent permitted by the law of any state in which the document presented here is to be nationalized, the technical teaching of WO2021083448A1 is fully incorporated in the disclosure of the document presented here.

Preferably, a control computer (μC) of the quantum computer (QC) controls these first means.

In this context, the document presented here refers, for example, to the document WO2021083448A1. To the extent permitted by the law of any state in which the document presented here is to be nationalized, the technical teaching of WO2021083448A1 is fully incorporated in the disclosure of the document presented here.

In the sense of the document presented here, the quantum computer program comprises at least one command and/or a command sequence for the control computer (μC) in the form of a quantum computer program code, which causes the control computer (μC) of the quantum computer (QC) to
- manipulate at least one quantum bit and/or a plurality of quantum bits in a predetermined manner by means of the first means and/or
- set a predetermined state of one or more quantum bits by means of the first means and/or
- set a predetermined superposition of one or more quantum states of one or more quantum bits of the quantum computer (QC) by means of the first means
- manipulate a predetermined superposition of one or more quantum states of at least one quantum bit and/or a plurality of quantum bits in a predetermined manner by means of the first means and/or
- read out the quantum state of one or more quantum bits by means of the second means.

In the sense of the document presented here, such a command or such a command sequence of the control computer (μC) of the quantum computer (QC) represents a quantum operation. Preferably, a quantum computer program code represents a quantum operation or an operation of the control computer (μC).

A quantum computer program in the sense of the document presented here includes at least one quantum operation. Thus, a quantum computer program in the sense of the document presented here has at least one command which, when executed by the control computer (μC) of the quantum computer (QC), ultimately leads to a manipulation of at least one quantum bit of the quantum bits of the quantum computer (QC) by means of the first means (M1) and/or a readout of at least one quantum bit of the quantum bits of the quantum computer (QC) by means of the second means (M2).

Interpreter-Operation of the Quantum Computer

In the sense of simple operability, it is also conceivable that the control computer (μC) interprets a text file with a source-code. The text file represents the user program and may usually be edited directly on a screen with a simple editor in a data processing system.

In this case, the text file of the user program is preferably stored in the memory (MEM) of the quantum computer (μC). The symbols of the text file of the user program are preferably stored in an ordered, preferably sequential order in the memory (MEM) of the quantum computer. If the memory (MEM) of the quantum computer (QC) cannot completely accommodate the text file, the control computer (μC) preferably loads the required components of the text file of the user program via a data interface from a mass storage, for example a hard drive or the like. The data interface may be a data bus (DB), for example. The mass storage is preferably connected to the data bus (DB). If the mass storage is occupied by other quantum computer system components, for example, due to occupation of the data bus, the control computer (μC) waits to reload until the data bus is free again. This may be accelerated if the quantum computer (QC) has a DMA-interface that directly reloads data of a quantum computer program with quantum computer program codes or text symbols for an interpreter. In this case, the control computer (μC) does not have to wait, because the DMA interface, for example, on request by the control computer (μC), reloads the data from the mass storage into the memory (MEM) of the quantum computer (QC) or, conversely, stores the data from the memory (MEM) of the quantum computer (QC) back into the mass storage e.

Preferably, the text file of the user program then includes symbol chains. For example, the symbols of the symbol chains may include symbols for letters, special characters, spaces and control characters such as new line, etc.

In the case of an interpreter, the control computer executes a basic program stored in the form of quantum computer program codes in the memory (MEM) of the quantum computer (QC), which the control computer (μC) executes. The symbols are preferably organized in words consisting of symbol chains of several successive symbols in the text file and then also in the memory (MEM) of the quantum computer (QC), which preferably generate human-readable text when displayed on a screen. Some symbol chains of the words preferably represent individual quantum computer program codes and/or sequences of quantum computer program codes. The basic program in the memory (MEM) of the quantum computer (QC) preferably specifies which quantum computer program code and/or quantum computer program code sequence is represented by the relevant symbol chain of a word. There, it is preferably encoded which concrete symbol chain corresponds to which quantum computer program code or which quantum computer program code sequence. A symbol chain may therefore also represent a subprogram of the quantum computer program.

If the control computer (μC) now finds, when analyzing the information of the text file in its memory (MEM), a symbol string within the information of the text file that corresponds to one of the predefined symbol strings in the memory by executing the basic program, the control computer correlates a quantum computer program code or a sequence of quantum computer program codes or a quantum computer subprogram to this symbol string by executing the basic program, and executes it. A correlation as to which quantum computer program code or which sequence of quantum computer program codes or which quantum computer subprogram is correlated to the symbol string is here preferably stored in the memory (MEM) of the quantum computer. When analyzing the symbol string, the control computer (μC) preferably accesses it and thereby identifies the quantum computer program code to be executed or the sequence of quantum computer program codes to be executed or the quantum computer subprogram to be executed. Therefore, strictly speaking, the control computer (μC) of the quantum computer (QC) executes the quantum computer program code in the memory (MEM) of the quantum computer (QC). Here, the memory (MEM) may include the command sequences that represent quantum operations. If the control computer (μC), which is part of the quantum computer (QC) in the sense of the document presented here, executes such a quantum computer program code of a command sequence of a quantum operation, the quantum computer thereby as a whole performs this quantum operation. Therefore, in this sense, the performance of a quantum operation in the sense of the document presented here is an execution of a command of a quantum computer program code in the memory (MEM) of the quantum computer (QC) or a command sequence of a quantum computer program code in the memory (MEM) of the quantum computer (QC) by the control computer (μC) of the quantum computer, which command or command sequence corresponds to such command or such command sequence of the control computer (μC) of the quantum computer (QC) and involves changing or reading out at least one quantum bit of the quantum computer in some way.

A quantum computer calculation in the sense of the document presented here is a quantum computer program or a quantum computer program section, which comprises at least one quantum computer program code for at least one quantum operation or at least one sequence of quantum operations.

In the sense of the document presented here, the quantum computer program flow is the expected time sequence of the processing of quantum computer program code by the control computer (μC) of the quantum computer (QC). The quantum computer program code in the form of quantum computer code here is preferably located in a memory (MEM) of the control computer (μC) of the quantum computer (QC). Preferably, a quantum computer code here consists of one or more data bits, which together symbolize at least one predetermined manipulation of one or more predetermined quantum bits. Here, a quantum computer program code may also represent conventional op-codes of the control computer (μC). The control computer (μC) may be an ARM processor, for example. Here, the quantum computer program may have a quantum computer program flow with loops and branches. As described above, the quantum computer program may also be available in readable form and interpreted by the control computer (μC) during operation. In the sense of the document presented here, a symbol string that represents a quantum computer code and/or represents a sequence of quantum computer codes and/or represents a quantum computer subprogram may therefore also be part of a quantum computer program. Thus, how the information about the quantum computer code that is to be executed is available to the control computer (μC) is ultimately irrelevant. The only important thing is that the control computer obtains the necessary information at the right time point about which quantum computer code is to be executed next. Such a command list is a quantum computer program in the sense of the document presented here. Therefore, the quantum computer program may be binary coded and/or available as interpretable plain text data in the memory (MEM) of the quantum computer (QC).

In many cases it is useful if a branch operation in the quantum computer program flow depends on the readout state of one or more quantum bits of the quantum computer (QC) at a time point and/or at a branch time point during the execution of the quantum computer program by the control computer (μC).

In many cases it is useful if the execution of a quantum computer program loop in the quantum computer program flow depends on the readout state of one or more quantum bits of the quantum computer (QC) at a time point and/or at a return time point and/or at the beginning of the quantum computer program loop and/or at the beginning of the quantum computer program loop and/or within the quantum computer program loop during execution of the quantum computer program by the control computer (μC).

The quantum computer monitoring device (QUV) monitors the correct quantum computer program flow of the quantum computer program of the quantum computer (QC). For example, in addition to the quantum computer program flow, the quantum computer monitoring device (QUV) may also monitor the value and/or value curve of one or more of the following operating parameters:

- a value of an operating voltage of an operating voltage line (VDD) of the quantum computer system (QUSYS) relative to a reference potential (GND),
- a value of a current consumption (IDD) of the quantum computer system (QUSYS) correlated with this operating voltage line (VDD),
- a value of an operating voltage of an operating voltage line (VDD) of the quantum computer (QC) relative to a reference potential (GND) and/or
- a value of a current consumption (IDD) of the quantum computer (QC) correlated with this operating voltage,
- a value of an operating voltage of an operating voltage line (VDD) of the control computer (μC) of the quantum computer (QC) relative to a reference potential (GND) and/or
- a value of a current consumption (IDD) of the control computer (μC) of the quantum computer (QC) correlated with this operating voltage,
- a value of an operating voltage of an operating voltage line (VDD) of the first means for manipulating the quantum bits of the quantum computer (QC) relative to a reference potential (GND) and/or
- a value of a current consumption (IDD) of the first means for manipulating the quantum bits of the quantum computer (QC) correlated with this operating voltage,
- a value of an operating voltage of an operating voltage line (VDD) of the second means for reading out the state of the quantum bits of the quantum computer (QC) relative to a reference potential (GND) and/or
- a value of a current consumption (IDD) of the second means for reading out the state of the quantum bits of the quantum computer (QC) correlated with this operating voltage,
- a value of an operating voltage of another device part of the quantum computer (QC), for example of measuring devices for detecting the magnetic flux density at the location of the quantum bits or in the vicinity of the quantum bits of the quantum computer (QC), relative to a reference potential (GND) and/or a value of the current consumption of such a device part of the quantum computer (QC) correlated with an operating voltage, the processor clock (QCCLK) of the control computer (µC) of the quantum computer (QC).

the value of the frequency of the processor clock (QCCLK) of the control computer (µC), the light output of a light source (LED) of a quantum computer (QC) for irradiating quantum bits (QUB) of the quantum computer (QC) with radiation.

the detection capability of electromagnetic radiation of a photodetector, which may be part of said second means for reading out the state of one or more quantum bits of the quantum computer (QC), for example, the expected correct generation of electromagnetic fields, in particular microwave fields and/or radio wave fields of a device of the quantum computer (QC), in particular said first means (M1), for manipulating one or more quantum bits (QUB), the complex and/or real and/or imaginary conductance of a line that is part of a device of the quantum computer (QC), in particular said first means (M1), for manipulating one or more quantum bits (QUB), the expected correct function of the second means (M2) for reading out the quantum states of the quantum bits (QUB) of the quantum computer (QC).

According to the proposal, the quantum computer (QC) carries out predetermined quantum computer calculations with at least one quantum operation by manipulating at least one quantum bit (QUB) of the quantum computer (QC) in predetermined time periods before predetermined time points (tv). Here, the quantum computer calculations include one or more quantum operations, which the quantum computer (QC) preferably performs in the expected manner according to an expected quantum computer program flow. The result of these predetermined quantum computer calculations of the quantum computer (QC) is the calculation of predetermined quantum computer calculation results by the quantum computer (QC).

According to the proposal, the quantum computer (QC) controls the quantum computer monitoring device (QUV) after these predetermined time points (tv). For this purpose, the control computer (µC) preferably sends a message to the quantum computer monitoring device (QUV) via a data bus (DB) or another signaling device. The content and time point of sending the message from the quantum computer (QC) to the quantum computer monitoring device is not arbitrary. In contrast to the prior art, when monitoring a quantum computer, the result of a quantum computer calculation cannot be determined exactly in advance in many cases, since such a quantum computer calculation result in the quantum bits may be in the form of a superposition of a plurality of possible quantum states that are superimposed in the quantum bits. If the control computer now reads out the state of the quantum bits, it only receives one possible quantum computer calculation result among a plurality of quantum computer calculation results. If the performed quantum computer calculation results provide a superposition of a plurality of such quantum computer calculation results as permitted quantum computer calculation results, then the one-time calculation of the quantum computer calculation results is generally not sufficient to infer that the quantum computer is functioning correctly. Rather, the quantum computer calculation device (QUV) enables the predetermined quantum computer calculation to be performed by the quantum computer (QC) several times and compares the respective frequency of the expected quantum computer calculation results with respective expected values for the quantum computer calculation results actually transmitted from the quantum computer (QC) to the quantum computer monitoring device (QUV). If this respective frequency of the quantum computer calculation results actually transmitted from the quantum computer (QC) to the quantum computer monitoring device (QUV) deviates from the respective expected values for the respective frequency of the expected quantum computer calculation results in the case of one or more expected values by more than a respective expected value deviation tolerance, then the quantum computer monitoring device (QUV) may infer that there is an error in the quantum computer (QC).

In order to keep the complexity small, it is useful if such a quantum computer calculation used to check the correct function of quantum bits of the quantum computer (QC) manipulates only a few quantum bits of the quantum computer (QC), preferably only one quantum bit of the quantum computer (QC).

In order to keep the complexity small, it is useful if such a quantum computer calculation used to check the correct function of couplings of quantum bits of the quantum computer (QC) manipulates only a few couplings of a few quantum bits of the quantum computer (QC), preferably only one coupling between two quantum bits of the quantum computer (QC). For example, such a quantum computer calculation may check a correct entanglement between two quantum bits of the quantum computer.

Here, the quantum computer must inform the quantum computer monitoring device of the expected quantum computer calculation result within a preferably predetermined time window. It may also be the result of a self-test of the quantum computer (QC). The self-test result is then typically a quantum computer calculation result in the sense of the document presented here.

If the quantum computer does not send the expected or the permitted quantum computer calculation result to the quantum computer monitoring device in time, i.e., not within the expected time window, the quantum computer monitoring device (QUV) infers that there is an error or faulty state in the quantum computer (QC). The quantum computer monitoring device (QUV) then preferably performs one or more countermeasures. In this case, it may be, for example, performing predetermined quantum computer calculations to test the quantum computer (QC) and/or to shutting down the relevant quantum computer (QC) and/or replacing the quantum computer (QC) with a quantum computer simulation device to ensure emergency operation and/or signaling an error to a higher-level unit and/or a user and/or placing the quantum computer system in an emergency state or the like. These measures prevent the quantum computer system, or a system influenced or controlled by the quantum computer system from entering an undefined or dangerous state.

In particular, the quantum computer monitoring device may check the quantum computer monitoring device results for plausibility. For example, predeterminable special quantum computer calculation results may be excluded from the outset. For example, it is conceivable that the quantum computer system is part of a higher level overall system and influences or controls it. In the set of possible quantum computer calculation results that could be transmitted to the higher-level overall system in the event of any type of malfunction of the quantum computer (QC), there may also be, for example, those quantum computer calculation results that would be predictable, render the higher-level overall system inoperable or damage it or bring it in an unsafe or dangerous state. Preferably, the quantum computer monitoring device (QUV) prevents the transmission of these erroneous quantum computer calculation results to the higher-level overall system. Preferably, in such a case, the quantum computer monitoring device (QUV), for example in cooperation with a central control device (ZSE) of the higher-level overall system, replaces the quantum computer calculation result with a predetermined substitute value together with a signaling of the erroneousness of the original quantum computer calculation result. Therefore, the higher-level overall system may recognize this and take countermeasures for its part.

For example, a countermeasure of the quantum computer monitoring device (QUV) may perform a reset (reset function) of the quantum computer (QC) to the quantum computer program start (QPS) or another predetermined quantum computer program point (QPV) or the like.

The quantum computer system and/or the quantum computer (QC) preferably include a data bus (DB). The control computer (µC) and/or a DMA interface of the quantum computer (QC) is preferably connected to the data bus (DB). For example, an external mass storage, such as a hard drive, may be connected to the data bus (DB). Preferably, the data bus (DB) couples the quantum computer (QC), in particular the control computer (µC) of the quantum computer with the quantum computer monitoring device (QUV). The quantum computer monitoring device (QUV) may be part of the quantum computer (QC). However, the quantum computer monitoring device (QUV) is preferably always part of the quantum computer system (QUSYS). The control computer (µC) of the quantum computer (QC) and thus the quantum computer (QC) may transmit program data and/or quantum program codes and/or information and/or quantum computer calculation results via the data bus (DB) to the quantum computer monitoring device (QUV). The quantum computer monitoring device (QUV) transmits information and/or requests and/or quantum computer program code and/or program data via the data bus (DB) to the quantum computer (QC) or to the control computer (µC) of the quantum computer (QC).

The running time of quantum computer programs that the control computer (µC) of the quantum computer (QC) and thus the quantum computer (QC) executes must be so short that the coherence of the quantum bits of the quantum computer (QC) is not lost during this time. The processing of quantum computer programs by the control computer (µC) therefore typically ends before this happens. In the following, such a time period is called as a quantum computer program section.

After a quantum computer program section has been executed, the control computer (µC) of the quantum computer (QC) must reinitialize the quantum bits of the quantum computer (QC) at the beginning of the next quantum computer program section by means of the first means and bring them into a predetermined superposition of quantum states. For this purpose, the control computer (µC) reads out a state of the relevant quantum bits of the quantum computer (QC) at the end of the preceding quantum computer program section by means of the second means. Since this readout always only provides one state of the quantum states of the quantum bits superimposing at the end of the preceding quantum computer program section, the control computer preferably executes a preceding quantum computer program section several times in order to be able to keep statistics on the states and to determine the type of superimposition at the end of the preceding quantum computer program section. The control computer (µC) then initializes this superimposition of the quantum states by means of the first means, preferably at the beginning of a quantum computer program section following the preceding quantum computer program section, so that there is still enough time for subsequent quantum computer calculations. This periodic processing of a quantum computer program by the quantum computer provides the possibility of inserting a quantum computer test program section between a preceding quantum computer program section and a subsequent quantum computer program section, in which the quantum computer (QC) performs a quantum computer calculation that the quantum computer monitoring device (QUV) has signaled to the quantum computer as a task and/or order and/or request.

Preferably, the result of this quantum computer calculation is predetermined within the quantum computer test program section. However, in contrast to the state of the art, since this is a quantum computer, the results are not deterministic. Instead, if necessary, a plurality of quantum states located in the quantum bits of the quantum computer (QC) may be the result of such a quantum computer calculation for testing purposes.

Here, the only thing that is deterministic is the distribution of the frequency of reading out the various results when the quantum computer test program section is executed several times by the quantum computer (QC). Therefore, if the same quantum calculation is to be executed several times in a plurality of quantum computer test program sections, the control computer (µC) of the quantum computer (QC) preferably transmits the respective quantum computer calculation results to the quantum computer monitoring device (QUV). The quantum computer monitoring device therefore does not check the result of the individual quantum computer calculation, but the statistical distribution of the results of the quantum computer calculations. Here, the quantum computer monitoring device preferably does not check all quantum bits, but always only a subset of the quantum bits of the quantum computer (QC) and/or a subset of the couplings between a plurality of, but at least two quantum bits of the quantum computer (QC) from the set of all couplings between quantum bits of the quantum computer (QC), in order to limit the amount of storage space physically required in a memory of the quantum computer monitoring device.

Once a first subset of the quantum bits of the quantum computer (QC) is checked in this manner, the quantum monitoring device (QUV) preferably checks a second subset of the quantum bits of the quantum computer (QC) in this manner. Preferably, but not necessarily, the first subset of quantum bits of the quantum computer (QC) and the second subset of quantum bits of quantum computer (QC) have a non-empty intersection.

Once a first subset of the couplings between a plurality of, but at least two quantum bits of the quantum computer (QC) from the set of all couplings between quantum bits of the quantum computer (QC) is checked in this manner, the quantum monitoring device (QUV) preferably checks a second subset of the couplings between a plurality of, but at least two quantum bits of the quantum computer (QC) from the set of all couplings between quantum bits of the quantum computer (QC) in this way. Preferably, but not necessarily, the first subset of couplings between a plurality of, but at least two quantum bits of the quantum computer (QC) from the set of all couplings between quantum bits of the quantum computer (QC) and the second subset of couplings between a plurality of, but at least two quantum bits of the quantum computer (QC) from the set of all couplings between quantum bits of the quantum computer (QC) have a non-empty intersection.

The execution of the quantum computer test program sections and the quantum computer program sections must not take an excessive amount of time. If the execution takes too long, there is an error that the quantum computer monitoring device (QUV) may identify. After the quantum computer monitoring device has set, for the quantum computer (QC), a task of a quantum computer calculation to be performed, the quantum computer monitoring device therefore expects that the quantum computer (QC) must drive the quantum computer monitoring device (QUV) after the predetermined time points (tv) in order to reset a timer in the quantum computer monitoring device to a starting value. Preferably, this timer in the quantum computer monitoring device starts running when the task is sent to the quantum computer (QC). If the timer of the quantum computer monitoring device reaches a predetermined critical timer value, the processing of the task by the quantum computer (QC) has taken too long. In this case, the quantum computer monitoring device (QUV) initiates countermeasures. Preferably, the quantum computer (QC) in driving the quantum computer monitoring device (QUV) transmits at least one quantum computer calculation result of a predetermined quantum computer calculation to the quantum computer monitoring device (QUV), preferably via the data bus (DB). The quantum computer monitoring device (QUV) then checks the quantum computer calculation result of the quantum computer (QC). If the quantum computer calculation result only involves a test of non-quantum technological functions of the control computer ($\mu C$) and other deterministic components of the quantum computer (QC), the quantum computer monitoring device may make a direct evaluation on the quantum computer calculation result. However, if quantum operations are involved, the quantum computer monitoring device (QUV) will only perform an evaluation and verification after receiving a plurality of quantum computer calculation results for the same quantum computer calculations of the quantum computer (QC) several times through statistical evaluation of the same. The quantum computer monitoring device thus verifies whether the statistical frequency of a plurality of quantum computer calculation results for the same quantum computer calculation performed several times corresponds to a predetermined frequency distribution. If the relative frequency of a quantum computer calculation result of this quantum computer calculation deviates by more than a predetermined amount from an expected frequency of this quantum computer calculation result of this quantum computer calculation with respect to the total number of the quantum computer calculation results used as a basis, the quantum computer monitoring device infers that there is an error in the quantum computer. Such an error may occur, for example, when an NV center is destroyed by diffusion in an NV-center based quantum computer. Other error mechanisms are conceivable. The error mechanisms also depend on the nature of the quantum computer.

Thus, the quantum computer monitoring device (QUV) infers an error state of the quantum computer (QC) when the quantum computer calculation result of the quantum computer (QC) is not within a predetermined allowed solution set for the quantum computer calculation result of the quantum computer (QC).

Thus, the quantum computer monitoring device (QUV) preferably creates a statistic of a plurality of quantum computer calculation results of similar quantum computer calculations of the quantum computer (QC) and infers that there is an error if the quantum computer calculation results of the quantum computer (QC) deviate from an expected quantum computer calculation result of the quantum computer (QC) more frequently than a predetermined maximum value.

The quantum computer monitoring device (QUV) thus preferably has a memory. In the memory of the quantum computer monitoring device (QUV) is preferably stored and/or will be stored a value corresponding to the maximum value which allows the quantum computer calculation results of the quantum computer (QC) to deviate from an expected quantum computer calculation result of the quantum computer (QC) most frequently. In the case of determination of an error by the quantum computer monitoring device (QUV), the quantum computer monitoring device (QUV) signals the occurrence of this error to the quantum computer (QC) or a higher-level system (ZSE). The quantum computer monitoring device (QUV) may also or instead provide information about this error, for example, for querying by a central control unit (ZSE) via the data bus (DB).

The quantum computer system (QUSYS) preferably includes a higher-level system, for example in the form of a central control unit (ZSE). The central control unit (ZSE) preferably controls a plurality of quantum computers (QC1 to QC16) via one or more data buses (DB).

Typically, it is a single common data bus (DB). Preferably, the proposed quantum computer system (QUSYS) has two mutually redundant and preferably common data buses (DB1, DB2). In the event that one of these at least two common data buses (DB1, DB2) fails, the central control unit can then still continue to control the quantum computers.

The quantum computer system (QUSYS) preferably comprises a plurality of quantum computers (QC1, QC2, . . . , QC16), which preferably execute the same quantum computer calculations in parallel and thus enable the central control unit (ZSE) to correct the statistically permissible errors. Preferably, the higher-level system (ZSE) provides a memory with a respective error counter value for at least one quantum computer (QC), preferably for all quantum computers (QC1, QC2, . . . , QC16) respectively, which is correlated to the respective quantum computer of the quantum computers.

The higher-level system (ZSE) increases the error counter value correlated with a quantum computer (QC) by a first error counter increment when the quantum computer monitoring device (QUV) signals a suspected error of the quantum computer (QC) correlated with the error counter value.

The higher-level system (ZSE) preferably decreases the error counter value correlated with a quantum computer (QC) by a second error counter increment when the quantum computer monitoring device (QUV) signals an assumed correctness of a quantum computer calculation result of the quantum computer (QC) correlated with the error counter value.

In the event that not all quantum computers of the quantum computer system are required for a quantum calculation task to be executed by the quantum computer system, the higher-level system (ZSE) uses the quantum computers of the quantum computer system with the respective lowest current error counter values correlated with the respective quantum computers for the execution of the intended calculation tas.

The monitoring tasks may also be performed by the quantum computer monitoring device (QUV) instead of by the higher-level system (ZSE).

Preferably, the quantum computer monitoring device (QUV) then provides a memory with a respective error counter value correlated with the respective quantum computer of the quantum computers for at least one quantum computer (QC), preferably for all quantum computers (QC1, QC2, . . . , QC16) respectively.

The quantum computer monitoring device (QUV) then increases the error counter value correlated with a quantum computer (QC) by a first error counter increment when the quantum computer monitoring device (QUV) signals a suspected error of the quantum computer (QC) correlated with the error counter value.

The quantum computer monitoring device (QUV) then preferably decreases the error counter value correlated with a quantum computer (QC) by a second error counter increment when the quantum computer monitoring device (QUV) signals an assumed correctness of a quantum computer calculation result of the quantum computer (QC) correlated with the error counter value.

The higher-level system (ZSE) then reads the error counter value in the quantum computer monitoring device (QUV) and, in the event that not all of the quantum computers of the quantum computer system are required for a quantum computing task to be executed by the quantum computer system, uses the quantum computers of the quantum computer system with the respective lowest current error counter values correlated with the respective quantum computer for the execution of the intended calculation task.

Preferably, the signaling of the quantum computer monitoring device (QUV) has the effect that this signaling:
resets the quantum computer (QC) and/or
brings the quantum computer (QC) into a predetermined state and/or
brings at least one quantum bit (QUB) of the quantum computer (QC) into a predetermined state and/or
brings at least one nuclear quantum bit (QUB) of the quantum computer (QC) into a predetermined state and/or.
brings at least one quantum register (QUREG) of the quantum computer (QC) into a predetermined state and/or
brings at least one nuclear quantum register (CQUREG) of the quantum computer (QC) into a predetermined state and/or
brings at least one nuclear-electron quantum register (CEQUREG) of the quantum computer (QC) into a predetermined state.

Preferably, in the event of a reset of the quantum computer, for example by the quantum computer monitoring device (QUV), the quantum computer (CQ) brings its quantum bits (QUB) and/or part of its quantum bits (QUB) into a predetermined combination of superimposed quantum states. Preferably, in the event of a reset, the quantum computer (CQ) also brings its nuclear quantum bits (CQUB) and/or part of its nuclear quantum bits (CQUB) into a predetermined combination of superimposed quantum states.

For example, the quantum computer (QC) may carry out targeted error drive of the quantum computer monitoring device (QUV), in particular by transmitting an erroneous quantum computer calculation result, in the event that a malfunction recognized by the quantum computer (QC) itself of by the control computer (μC) of the quantum computer (QC) itself occurs to trigger a reset function of the quantum computer (QC) that may be triggered by the quantum computer monitoring device (QUV). This saves a separate signal line and enables the quantum computer monitoring device (QUV) and/or the central control device (ZSE) to recognize this state of the quantum computer (QC).

Preferably, the quantum computer (QC) may perform the error drive, for example, by the fact that the quantum computer (QC), within a predetermined and/or predeterminable time span, drives the quantum computer monitoring device (QUV), in particular by transmitting an incorrect and/or correct quantum computer calculation result, more frequently than a predetermined and/or predeterminable maximum number for this time span.

The quantum computer monitoring device (QUV) preferably infers that there is an error if the quantum computer (QC) transmits a quantum computer calculation result to the quantum computer monitoring device (QUV) before a predetermined second time point (t2), wherein this predetermined second time point (t2) is after the predetermined time point (tv) or equal to the predetermined time point (tv), and/or if the quantum computer (QC) transmits a quantum computer calculation result to the quantum computer monitoring device (QUV) after a predetermined third time point (t3), wherein this predetermined third time point (t3) is after the predetermined time point (tv) or equal to the predetermined time point (tv). Here, the quantum computer calculation result may well be correct. However, the incorrect time of delivery then indicates an error in the quantum computer (QC).

Preferably, the quantum computer monitoring device (QUV) signals to the quantum computer (QC) before the start of a predetermined time period (Tv) which predetermined quantum computer calculation or which predetermined quantum computer calculations the quantum computer (QC) should perform. This enables the quantum computer monitoring device (QUV) to initialize and correctly determine the statistic of the quantum computer calculation results. The quantum computer monitoring device thus performs a measurement of the statistic of the quantum computer calculation results of the quantum computer (QC) for a specific quantum computer calculation task with a specific quantum computer calculation. This enables the quantum computer monitoring device to infer that there is an error in the quantum technological components and their driving means, i.e., the first and second means, of the quantum computer (QC). This is not possible in the prior art. Here, the quantum computer monitoring device infers that there is an error in the quantum computer if these statistics of the quantum computer calculation results of the quantum computer (QC) deviate by more than a respective predetermined amount from the expected statistics of the quantum computer calculation results of the quantum computer (QC).

The quantum computer monitoring device (QUV) typically signals to the quantum computer (QC) the start and, if necessary, the end or duration of the predetermined time period (Tv).

The quantum computer (QC) typically monitors for a malfunction in itself and/or in other components and/or quantum computer system components. For example, this may be such circumstance in which the control computer (μC) of the quantum computer (QC) or a special self-test device within the quantum computer (QC) tests the control computer and/or the first and second means between two quantum computer calculations. This self-test device of the quantum computer may be a quantum computer monitoring device, which is then correlated with exactly one quantum computer and is therefore also considered part of the quantum computer in the document presented here.

The quantum computer monitoring device (QUV) typically monitors for a malfunction in itself and/or in other components and/or quantum computer system components. For example, in monitoring the other components, the quantum computer monitoring device may behave like a conventional watch-dog-circuit.

Furthermore, the quantum computer monitoring device itself may be a quantum computer (QC) that includes at least two quantum bits. This means that a plurality of quantum computers (QC1 to QC16) may monitor each other.

An exemplary device for monitoring a quantum computer (QC), in particular for use in a quantum computer system as described above, preferably comprises a quantum computer (QC), a quantum computer monitoring device (QUV) and an internal clock (ICLK), which supplies in particular the control computer ($\mu$C) of the quantum computer and preferably also all other circuits with conventional logic with a base clock for operation. The quantum computer (QC) is typically connectable and/or connected to a quantum computer monitoring device (QUV), in particular via a data bus (DB) or special signal lines, for monitoring the quantum computer (QC). The quantum computer monitoring device (QUV) is connectable and/or connected to an internal clock generator (ICLK) for monitoring a system clock of the quantum computer (QC). A clock line within the quantum computer connects, for example, the control computer ($\mu$C) with the internal clock generator (ICLK) and with other device parts of the quantum computer that require a clock to work. The quantum computer monitoring device (QUV) comprises means for verifying the quantum computer program flow of the quantum computer program of the quantum computer (QC). In this case, this may be, for example, a memory in which programs and data for a processor within the quantum computer monitoring device (QUV) are stored. These programs then typically relate to test procedures to execute the test functions described here. However, the means may also be quantum bits and correlated means for driving and reading out the states of these quantum bits, for example to calculate the expected results of quantum computer calculations in a monitored quantum computer (QC) in the quantum computer monitoring device (QUV) itself and provide for comparisons with the quantum computer calculation result of the quantum computer (QC). In that case, the quantum computer monitoring device (QUV) is itself a quantum computer.

Thus, the quantum computer monitoring device (QUV) preferably also comprises means for verifying the correct function of the quantum computer (QC). Furthermore, the quantum computer monitoring device (QUV) comprises means for verifying the correct performance of manipulations of quantum bits (QB) of the quantum computer (QC). For example, this may be the processor within the quantum computer monitoring device.

Furthermore, the quantum computer monitoring device preferably comprises means for monitoring the operating parameters of the quantum computer (QC), such as the magnetic field at the location of the quantum bits of the quantum computer (QC) and/or the irradiation of electromagnetic waves in the area of the quantum bits (QUB) and/or the temperature of the material of the quantum bits (QUB) and/or the irradiation, in particular with ionizing and/or electromagnetic radiation. In addition, the quantum computer monitoring device (QUV) preferably comprises means for monitoring the tests of system components of the quantum computer. When at least one error is detected, the quantum computer monitoring device (QUV) transmits an error message to the quantum computer (QC) and increments or decrements or changes an error counter in a predetermined manner. Here, the counting direction within a quantum computer monitoring device (QUV) should typically be the same, so it should preferably only be decremented or incremented.

The quantum computer monitoring device (QUV) preferably comprises its own control computer ($\mu$CQUV) of the quantum computer monitoring device (QUV).

The quantum computer monitoring device (QUV) typically transmits test questions to the quantum computer (QC) when verifying the quantum computer program, usually via the data bus.

The quantum computer monitoring device (QUV) monitors the responses of the quantum computer (QC) received from the quantum computer (QC) via the data bus for correctness and/or time point and/or statistical correctness. This makes it possible to recognize the errors such as the failure of a quantum bit. In the sense of the document presented here, the calculation of the responses to the test questions in the form of a quantum computer calculation typically requires at least one manipulation of a state of a quantum bit and/or at least one quantum operation of the quantum computer (QC). Thus, this differs from the state of the art, which does not know any quantum operations and the correlated statistical problems.

When monitoring the tests of the system components (SYSC), the quantum computer monitoring device (QUV) preferably transmits test commands to the quantum computer (QC), preferably via the data bus. The quantum computer (QC) then typically sends back to the quantum computer monitoring device (QUV) a quantum computer calculation result corresponding to the test question, which the quantum computer monitoring device (QUV) monitors for correctness and time point and/or statistical correctness.

The quantum computer monitoring device (QUV) may, for example, in the event of the at least one recognized error, perform the following operations on a device (GR) connected to the quantum computer (QC);
  a) lock its function for a predetermined period of time or
  b) bring it into a safe state or
  c) prevent the quantum computer from accessing the device (GR), or
  d) connect the device (GR) to a quantum computer simulation device instead of to the quantum computer.

This prevents the quantum computer (QC) from bringing connected systems or systems of which it is a part into an unsafe state. Preferably, the quantum computer monitoring device (QUV) is here preferably directly connectable to the relevant device (GR).

The quantum computer monitoring device (QUV) preferably extends the locking of the device (GR) or the assumption of the safe state by the device (GR), if the quantum computer monitoring device (QUV) recognizes at least one other error in the quantum computer (QC) during the locking of the device (GR) or while the device (GR) is in the safe state.

If the preferably present error counter of the quantum computer monitoring device (QUV) has reached a predetermined value, the quantum computer monitoring device (QUV) preferably causes the device (GR) to be locked or the device (GR) to assume a safe state until the quantum computer monitoring device (QUV) is switched off.

Typically, the device (GR) connectable to the quantum computer (QC) is a system of a vehicle, a system of a motorcycle, a system of a flying body, a system of an aircraft of a floating body or a system of an aircraft of a robot or a system of an aircraft of an airplane or a system of an aircraft of a satellite or a system of an aircraft a weapon system. In this case, a flying body should include all types of flying devices. Here, a floating body should include all types of floating and diving devices, in particular boats, ships, buoys, torpedoes, mines, jet skis, submarines, etc.

Here, a flying body should also include all types of flying objects, including but not limited to airplanes, drones, gliders, airships, helicopters, VTOL devices, projectiles, rockets, etc.

Here, a satellite should include all devices intended for operation in space and/or near-Earth orbit, i.e., unmanned and manned satellites, unmanned and manned spacecraft, space stations, etc.

The quantum computer monitoring device (QUV), when switched on, causes the device (GR) to be locked and/or the device (GR) to assume a safe state, until the quantum computer monitoring device (QUV) recognizes faultlessness, in particular in the points mentioned above.

Preferably, the error counter and individual errors can be read out from the quantum computer monitoring device (QUV) by the quantum computer (QC) and/or a higher-level central control unit (ZSE).

The quantum computer monitoring device (QUV) determines the time points of the responses of the quantum computer (QC) and the task confirmations by at least one internal counter (ICNT) or timer of the quantum computer monitoring device (QUV).

Typically, a response of the quantum computer (QC), preferably in the form of a quantum computer calculation result in the sense of the document presented here, depends on at least one manipulation of a quantum bit of the quantum computer.

A quantum computer system may have, for example, a plurality of quantum computers, but preferably at least two quantum computers. In this minimal configuration of a quantum computer system, these are a first quantum computer (QC1) and a second quantum computer (QC2). The first quantum computer (QC1) may signal to the second quantum computer (QC2) via at least one signal connection (DB). This signal connection is typically a data bus, which, for example, connects the control computers (µC) of the quantum computers to one another via respective data interfaces of the control computers of the quantum computers.

Preferably, in many cases, signaling here is a quantum computer calculation result which is transmitted by one quantum computer to the other, for example as a comparison result. In the sense of the document presented here, a quantum computer calculation result is the calculation result of a quantum computer (QC) with the help of at least one manipulation of a quantum bit of this quantum computer:

The second quantum computer (QUC2) compares the quantum computer calculation result of the first quantum computer (QC1), which it preferably received via the data bus (DB), with an expected value.

The expected value is typically the quantum computer calculation result of a quantum computer calculation of the second quantum computer (QC2) or another quantum computer. The expected result is typically provided with tolerance values, which are typically determined by the second quantum computer (QC2) using a plurality of identical quantum computer calculations of a plurality of quantum computer calculation results. The second quantum computer (QC2) then typically verifies the quantum computer calculation result of the quantum computer (QC1). The second quantum computer (QC2) infers that the first quantum computer (QC1) is in an error state if the quantum computer calculation result of the first quantum computer (QC1) is not within a predetermined allowed solution set for the quantum computer calculation result of the first quantum computer (QC1).

The second quantum computer (QC2) preferably creates a statistic of a plurality of results of similar quantum computer calculations of the first quantum computer (QC1) and infers that there is an error if the quantum computer calculation results of the first quantum computer (QC1) deviate from an expected quantum computer calculation result of the first quantum computer (QC1) more frequently than a predetermined maximum value.

The second quantum computer (QC2) preferably creates a first statistic of a plurality of results of similar quantum computer calculations of the first quantum computer (QC) and infers that there is an error if the quantum computer calculation results of the first quantum computer (QC) deviate from a second statistic of a plurality of results of corresponding similar quantum computer calculations of the second quantum computer (QC2) or another quantum computer more frequently than a predetermined maximum value.

In the case of an error being inferred, the second quantum computer (QC2) signals the occurrence of this error to the first quantum computer (QC1) or a higher level system (ZSE) and/or keeps an information about this error available, which may then be read out typically via the data bus (DB), for example, by a higher-level central control device (ZSE).

The signaling of the second quantum computer (QC2) may, for example, reset the first quantum computer (QC1) or set it to a predefined state or set is to one of a set of predefined states.

In the event of a reset, the first quantum computer (QC1) preferably brings its quantum bits into a predetermined combination of superimposed quantum states.

For example, the first quantum computer (QC1) may carry out a targeted error drive of the second quantum computer (QC2), in particular by transmitting an erroneous quantum computer calculation result from the first quantum computer (QC1) to the second quantum computer (QC2), when a malfunction recognized by the first quantum computer (QC1) itself occurs to trigger a reset function originating from the second quantum computer (QC2).

The second quantum computer (QC2) infers that there is an error if the first quantum computer (QC1) transmits a quantum computer calculation result from the first quantum computer (QC1) to the second quantum computer (QC2) before a predetermined second time point, wherein this predetermined second time point is after the predetermined time point or equal to the predetermined time point.

The second quantum computer (QC2) infers that there is an error if the first quantum computer (QC1) transmits a quantum computer calculation result from the first quantum computer (QC1) to the second quantum computer (QC2) after a predetermined third time point, wherein this predetermined third time point is after the predetermined time point or equal to the predetermined time point.

The second quantum computer (QC2) preferably signals to the first quantum computer (QC1) before the start of the predetermined time period which predetermined quantum computer calculation or which predetermined quantum computer calculations the first quantum computer (QC1) should perform.

The second quantum computer (QC2) signals to the first quantum computer (QC1) the start and, if necessary, the end or the duration of the predetermined time period.

The said error drive is preferably achieved by too frequent operation (drive) of the second quantum computer (QC2).

The first quantum computer (QC1) preferably monitors for a malfunction in itself and/or in other components and/or quantum computer system components. That is, the first quantum computer (QC1), and in particular the control computer (µC) of the first quantum computer (QC1), preferably has means, for example a JTAG interface, for verifying other components and/or quantum computer system components.

The proposed quantum computer system may include a plurality of, preferably at least two, quantum computers. These are preferably a first quantum computer (QC1) and a second quantum computer (QC2). Furthermore, the quantum computer system preferably comprises a plurality of measuring devices for detecting operating variables of the quantum computer system (QUSYS) or a device or a system. If necessary, the states of the device or the system depend on the quantum computer system (QUSYS), typically on quantum computer calculation results of one or more quantum computers of the quantum computer system. For example, the quantum computer system may control the device or the system. Here, the first quantum computer (QC1) typically performs at least temporarily the same quantum computer calculation performed by the second quantum computer (QC2). Here, the quantum computer calculation preferably includes a monitoring measure for verifying the functionality of the respective quantum computer (QC1, QC2). Here, the first quantum computer (QC1) performs the quantum computer calculation of the first quantum computer (QC1) independently of the quantum computer calculation of the second quantum computer (QC2).

Here, the first quantum computer (QC1) typically performs the monitoring measure and the second quantum computer (QC2) performs an equivalent monitoring measure corresponding to this monitoring measure in a simpler execution or following a different strategy on a redundant path. In this case, for example, this may be a conventional calculation by the control computer of the second quantum computer.

The first quantum computer (QC1) may, for example, carry out a monitoring measure based on the difference between a predeterminable or enterable set value and an actual value of a control loop of an adjusting element, while the second quantum computer (QC2) may perform monitoring measures of a simpler type based on a plausibility comparison between the predeterminable or enterable set value, preferably the position of an operating element, and the position of the adjusting element.

In this example, the quantum computers particularly preferably monitor one another by exchanging data via a respective data interface of the respective control computer of the respective quantum computer and the data bus.

In many possible applications of such a quantum computer system in a control loop, for example, both quantum computers of the quantum computer system have access to a driver stage for the adjusting element of the control loop and, in the case of an error being recognized, switch off the driver stage independently of each another in accordance with the result of the monitoring measures correlated to them in the event of implausibilities with regard to the control loop of the application and the position signals of the control element of the control loop generated directly or indirectly by the quantum computer. Alternatively, they may bring it into a safe state. Preferably, the quantum computers inform each other of, in particular, the negative results of their monitoring.

In the event of an error, the first quantum computer (QC1) may, for example, intervene in the energy supply of an application system or in the application system itself as a countermeasure.

In the second quantum computer (QC2), plausibility checks are preferably performed for switching on and off a regulator of the exemplary application system in the form of a control loop.

Here, the plausibility checks preferably include at least quantum computer calculation, which includes at least one manipulation of a quantum bit of the second quantum computer (QC2).

In a method according to the disclosure for monitoring the execution of a quantum computer program that may be run on at least one control computer (µC) of a quantum computer (QC) by means of a quantum computer monitoring device (QUV) of the quantum computer (QC), the quantum computer (QC) preferably includes quantum bits, the control computer (µC), first means for manipulating quantum bits of the quantum computer (QC) and second means for reading out the state of quantum bits of the quantum computer (QC). Here, the first means for manipulating quantum bits of the quantum computer (QC) and the second means for reading out the state of quantum bits of the quantum computer (QC) are typically controlled by the control computer (µC). The quantum computer monitoring device (QUV) may preferably trigger an exception condition (Exception), in particular correlated with an interruption (Interrupt) of the quantum computer program flow, when a predetermined subset of the quantum bits of the quantum bits of the quantum computer (QC) is manipulated during the quantum computer program running time. This means manipulating a quantum bit that should not be manipulated. Furthermore, the quantum computer monitoring device preferably has means to recognize and detect an activation of means for manipulating these quantum bits, which are actually not intended to be manipulated or are specially protected quantum bits (QUP), to infer that there is an error and, if necessary, to take countermeasures.

The quantum computer monitoring device (QUV) may, for example, also trigger an exception condition (Exception), in particular an interruption (Interrupt) of the quantum computer program flow, when accessing a specific address range (AB) during the quantum computer program running time.

The control computer (µC) of the quantum computer (QC) preferably runs an exception condition routine (exception routine) after an exception condition has been triggered during the quantum computer program running time.

The exception condition routine (exception routine) may, for example, also include at least one quantum operation for manipulating at least one quantum bit (QUB) of the quantum computer (QC).

The control computer (µC) of the quantum computer (µC) or a central control unit (ZSE) or a control computer of another quantum computer or another computing system may, in one example, configure the quantum computer monitoring device (QUV).

Preferably, quantum computer monitoring device (QUV) is configured during startup of the quantum computer (QC).

The quantum computer (QC) is preferably reset and restarted during the execution of the exception routine and the monitored quantum computer program is initialized. Before resetting and restarting the quantum computer (QC) and before initializing the quantum computer program, at least the type of error state, in particular by the control computer (µC), is preferably stored in an error memory, in particular within a memory (MEM) of the quantum computer (QC).

Before resetting and restarting the quantum computer (QC) and before initializing the quantum computer program, the memory address that was accessed by the control computer (µC) before the error state occurred, in particular by the control computer (µC), is stored in the error memory, in particular within a memory (MEM) of the quantum computer (QC).

The quantum computer monitoring device (QUV) preferably monitors whether the quantum computer program accesses a predeterminable address range (AB) of a memory (MEM) of the quantum computer (QC) during the quantum computer program running time.

The quantum computer monitoring device (QUV) preferably monitors whether the quantum computer program accesses an address range (AB) of a stack of the quantum computer (QC) within a memory (MEM) of the quantum computer (QC) beyond a predeterminable maximum stack size, which may in particular correspond to a predeterminable address range (AB), during the quantum computer program running time.

The quantum computer monitoring device (QUV) monitors whether the quantum computer program causes the control computer (µC) to manipulate a predeterminable subset of quantum bits of the quantum bits of the quantum computer (QC) through the first means using a quantum bit operation during the quantum computer program running time.

The quantum computer monitoring device (QUV) monitors whether the quantum computer program causes the control computer (µC) of the quantum computer (QC) to manipulate quantum bits of the quantum computer (QC) through first means, which are not part of the predeterminable subset of quantum bits of the quantum bits of quantum computing (QC), during the quantum computer program running time.

The quantum computer monitoring device (QUV) monitors whether an attempt is made, in particular by the control computer (µC), to execute a code sequence of the quantum computer program in the non-volatile memory (NVM), which is swapped from a non-volatile memory (NVM) of the quantum computer (QC) to a random access memory (RAM) of the quantum computer (QC), during the quantum computer program running time.

The document presented here also relates to a control element (NVM), in particular read-only memory or flash memory or non-volatile memory, for a quantum computer (QC), in particular a control unit (SG) of a vehicle, wherein a quantum computer program is stored on the control element (NVM), which is executable on at least one control computer (µC) of the quantum computer (QC) and is suitable for executing a method as described above.

The document presented here also relates to a quantum computer (QC) with at least one control computer (µC) and a quantum computer monitoring device (QUV), wherein a quantum computer program is executable on the at least one control computer (µC), the quantum computer monitoring device (QUV) monitors the execution of the program during the quantum computer program running time and triggers an exception condition (Exception), in particular an interruption (Interrupt) of the quantum computer program flow, when accessing a specific address range (AB) within a memory (MEM) of the quantum computer (QC). Here, the control computer (µC) or a central control unit (ZSE) or another computer system preferably configures the quantum computer monitoring device (QUV). The quantum computer (QC) preferably includes means for running an exception condition routine (exception routine) after an exception condition is triggered during the quantum computer program running time.

Preferably, the quantum computer (QC) has other means for executing the method described above.

Another method of operating a quantum computing system (QUSYS) with a quantum computer (QC) and with a quantum computer monitoring device (QUV) includes the steps:
  monitoring the correct quantum computer program flow of the quantum computer program of the quantum computer (QC), in particular by the quantum computer monitoring device (QUV), and
  performing predetermined quantum computer calculations with at least one quantum operation for calculating predetermined quantum computer calculation results in predetermined time periods before predetermined time points, in particular by the quantum computer (QC), and driving a quantum computer monitoring device (QUV) after these predetermined time points and performing a reset (reset function) of the quantum computer (QC) to a quantum computer program start or the like when this drive is not carried out in a predetermined manner.

An additional further step may be transmitting at least one result of a predetermined quantum computer calculation of the quantum computer (QC) to the quantum computer monitoring device (QUV) upon this drive.

An additional further step may be verifying the quantum computer calculation result of the predetermined quantum computer calculation of the quantum computer (QC) transmitted to the quantum computer monitoring device (QUV), in particular by the quantum computer (QC).

An additional further step may be inferring an error state of the quantum computer (QC) if the quantum computer calculation result of the predetermined quantum computer calculation of the quantum computer (QC) is not within a predetermined allowed solution set for the quantum computer calculation result of the predetermined quantum computer calculation of the quantum computer (QC).

Additional further steps may be creating statistics of a plurality of quantum computer calculation results of similar predetermined quantum computer calculations of the quantum computer (QC), which were transmitted to the quantum computer monitoring device (QUV), in particular by the quantum computer (QC), and inferring an error, in particular by the quantum computer monitoring device. Here, it is inferred that there is an error if the quantum computer calculation results of the predetermined quantum computer calculations of the quantum computer (QC) with a first number deviate from an expected quantum computer calculation result of the quantum computer (QC) for these quantum computer calculations more frequently than a predetermined first maximum value.

Preferably, the count of the first number of deviations from the expected quantum computer calculation result of the quantum computer (QC) for these quantum computer calculations is reset again to a predetermined first starting value of this count value of this count, in particular to 0, if a second number of quantum computer calculation results of successive quantum computer calculations matches an expected quantum computer calculation result of the quantum computer (QC) for these quantum computer calculations in a predetermined manner more frequently than a predetermined second maximum value.

An additional further step may be the signaling of the occurrence of an error, in particular by the quantum computer monitoring device (QUV), to the quantum computer (QC) or to a higher-level system in the event of inferring an error, in particular by the quantum computer monitoring device (QUV), and/or the providing of information about the occurrence of an error, in particular by the quantum computer monitoring device (QUV), in the event of inferring an error, in particular by the quantum computer monitoring device (QUV).

An additional further step may be the resetting the quantum computer (QC) by the signaling, in particular of the quantum computer monitoring device (QUV).

Preferably, resetting the quantum computer (QC) by the signaling includes resetting the control computer (µC) of the quantum computer (QC).

Preferably, resetting the quantum computer (QC) by the signaling causes the quantum computer (QC) to bring at least part of the quantum bits of the quantum computer into a predetermined and/or predeterminable state and/or into a predetermined superposition of a plurality of predetermined states.

Preferably, resetting the quantum computer (QC) by the signaling causes the quantum computer (QC) to perform at least one predetermined quantum computer calculation.

Preferably, the quantum computer (QC) transmits the quantum computer calculation result of this quantum computer calculation to the quantum computer monitoring device (QUV). Preferably, the quantum computer monitoring device (QUV) verifies the quantum computer calculation result of this quantum computer calculation of the quantum computer (QC).

An additional further step may include the manipulation of quantum bits of the quantum computer (QC), in particular by the quantum computer (QC), in such a way that these quantum bits of the quantum computer (QC) are set in a predetermined combination of superimposed quantum states in the event of a resetting the quantum computer, in particular by the quantum computer (QC).

An additional further step may be to carry out a targeted error drive of the quantum computer monitoring device (QUV), in particular by transmitting an incorrect quantum computer calculation result, in particular by the quantum computer (QC), in particular to the quantum computer monitoring device (QUV), when a malfunction of the quantum computer (QC) or its auxiliary units recognized by the quantum computer (QC) itself, in particular by its control computer (µC) or another auxiliary device of the quantum computer (QC), occurs to trigger a reset function originating from the quantum computer monitoring device (QUV).

Preferably, the reset function originating from the quantum computer monitoring device (QUV) triggers a reset of the control computer (µC) of the quantum computer (QC).

The reset function originating from the quantum computer monitoring device (QUV) preferably causes the quantum computer (QC) to bring at least part of the quantum bits of the quantum computer into a predetermined and/or predeterminable state and/or into a predetermined superposition of a plurality of predetermined states.

The reset function originating from the quantum computer monitoring device (QUV) preferably causes the quantum computer (QC) to perform at least one predetermined quantum computer calculation.

The quantum computer (QC) preferably transmits the quantum computer calculation result of this quantum computer calculation to the quantum computer monitoring device (QUV).

The quantum computer monitoring device (QUV) typically verifies the quantum computer calculation result of this quantum computer calculation of the quantum computer (QC).

An additional further step may be the inferring an error, in particular by the quantum computer monitoring device (QUV), if the transmission of a quantum computer calculation result, in particular by the quantum computer (QC), in particular to the quantum computer monitoring device (QUV), takes place before a predetermined second time point. Here, this predetermined second time point typically is after the predetermined time point or equal to the predetermined time point.

An additional further step may be the inferring an error, in particular by the quantum computer monitoring device (QUV), if the transmission of a quantum computer calculation result, in particular by the quantum computer (QC), in particular to the quantum computer monitoring device (QUV), takes place after a predetermined third time point. Here, this predetermined third time point preferably is after the predetermined time point or equal to the predetermined time point.

An additional further step may be the signaling to the quantum computer, in particular by the quantum computer monitoring device (QUV), before the start of the predetermined time period, which predetermined quantum computer calculation or which predetermined quantum computer calculations the quantum computer (QC) should perform.

An additional further step may be the signaling, in particular by the quantum computer monitoring device (QUV), of the time of the start of the predetermined time period and, if necessary, the time of the end of the predetermined time period or the duration of the predetermined time period to the quantum computer (QC).

An additional further step may be the inferring an error, in particular by the quantum computer monitoring device (QUV), if the quantum computer monitoring device, in particular by the quantum computer (QC), is driven too frequently, in particular more frequently than an expected drive value within an additional time period.

An additional further step may be the monitoring for a malfunction of the quantum computer (QC) by the quantum computer (QC) itself and/or the monitoring for malfunction of other components and/or functional elements of the quantum computer system (QUSYS) by the quantum computer (QC) and/or the monitoring for a malfunction of quantum computer system components by the quantum computer (QC) itself.

Furthermore, the document presented here describes a method for monitoring the correct quantum computer program flow of a quantum computer system (QUSYS) provided with a quantum computer monitoring device (QUV), in particular using one of the methods described above. The quantum computer system (QUSYS) comprises a quantum computer (QC), wherein the quantum computer (QC) drives the quantum computer monitoring device (QUV) at specific time intervals, in particular via a data bus (DB) by means of a message, and wherein the quantum computer monitoring device (QUV) triggers a reset (reset function) of the quantum computer (QC) without this drive.

Here, the reset typically causes the control computer (µC) of the quantum computer (QC) to jump to the quantum computer program start or another predetermined program point of the quantum computer program.

The reset typically causes the control computer (µC) of the quantum computer (QC) to bring at least part of quantum bits of the quantum computer (QC) into a predefined or predefinable quantum state or into a predefined or predefinable superposition of such quantum states, wherein these quantum bits include at least part of the quantum bits of the quantum computer (QC).

Preferably, the quantum computer (QC) carries out a targeted error drive of the quantum computer monitoring device (QUV) when a malfunction recognized by the quantum computer (QC) occurs to trigger a reset function originating from the quantum computer monitoring device (QUV).

Finally, it should be noted that a quantum sensor system with one or more quantum dots as sensor elements may be understood as a quantum computer in the sense of this disclosure and therefore may fall within the claim, if the quantum sensor system includes a quantum sensor monitoring device which corresponds in its properties to a quantum computer monitoring device (QUV) in the sense of the document presented here.

With the help of a quantum monitoring device (QUV) and the correlated methods, quantum computers controlling a system may be prevented from setting or driving states of this system that are safety-critical.

DESCRIPTION

Figure 1:
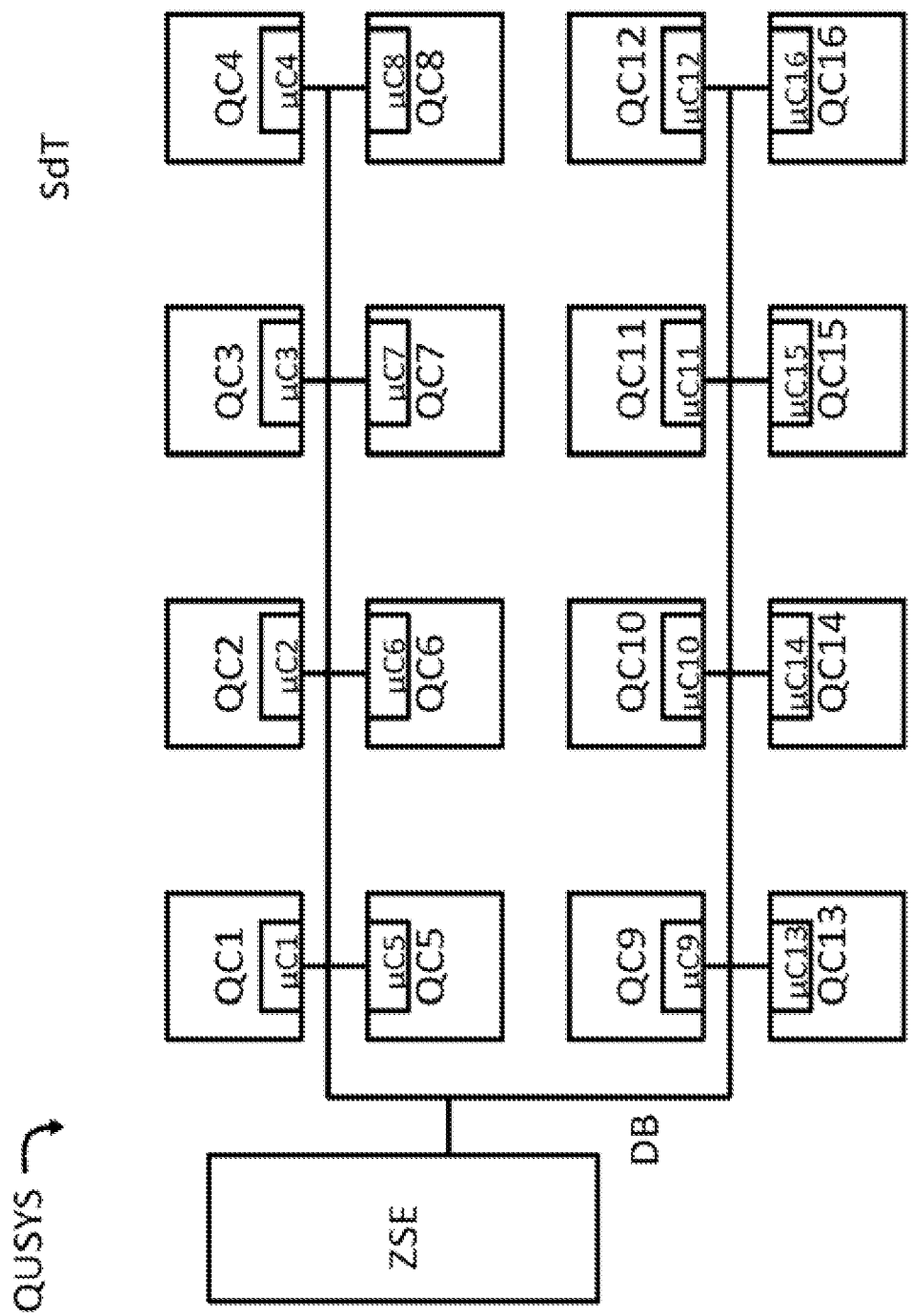
FIG. 1 shows a quantum computer system (QUSYS) of the international patent application WO 2021083448 A1, which was still unpublished at the time of filing the priority patent application DE 102021 110964.7 dated Apr. 28, 2021 of the document presented here.

FIG. 1 shows a quantum computer system (QUSYS) of the international patent application WO 2021083448 A1, which was still unpublished at the time of filing the priority patent application DE 102021 110964.7 dated Apr. 28, 2021, of the document presented here. To the extent permitted by the law of any state in which the document presented here is to be nationalized, the technical teaching of WO 2021083448 A1 is fully incorporated in the disclosure of the document presented here, the technical teaching of which is fully incorporated in this disclosure to the extent permitted by law. The quantum computer system (QUSYS) of FIG. 1 includes 16 quantum computers (QC1 to QC16). Therefore, FIG. 1 is marked as prior art (SdT), even if this is still unpublished prior art at the time of filing the priority patent application DE 102021110964.7 dated Apr. 28, 2021, of the document presented here. Each of the 16 quantum computers (QC1 to QC16) of the exemplary quantum computer system has at least one control computer (µC1 to µC16) respectively. Each of the 16 control computers (µC1 to µC16) of the 16 quantum computers (QC1 to QC16) is connected to a data bus (DB) via a data bus interface. A central control unit (ZSE) controls the 16 quantum computers (QC1 to QC16) via the data bus (DB).

Figure 2:
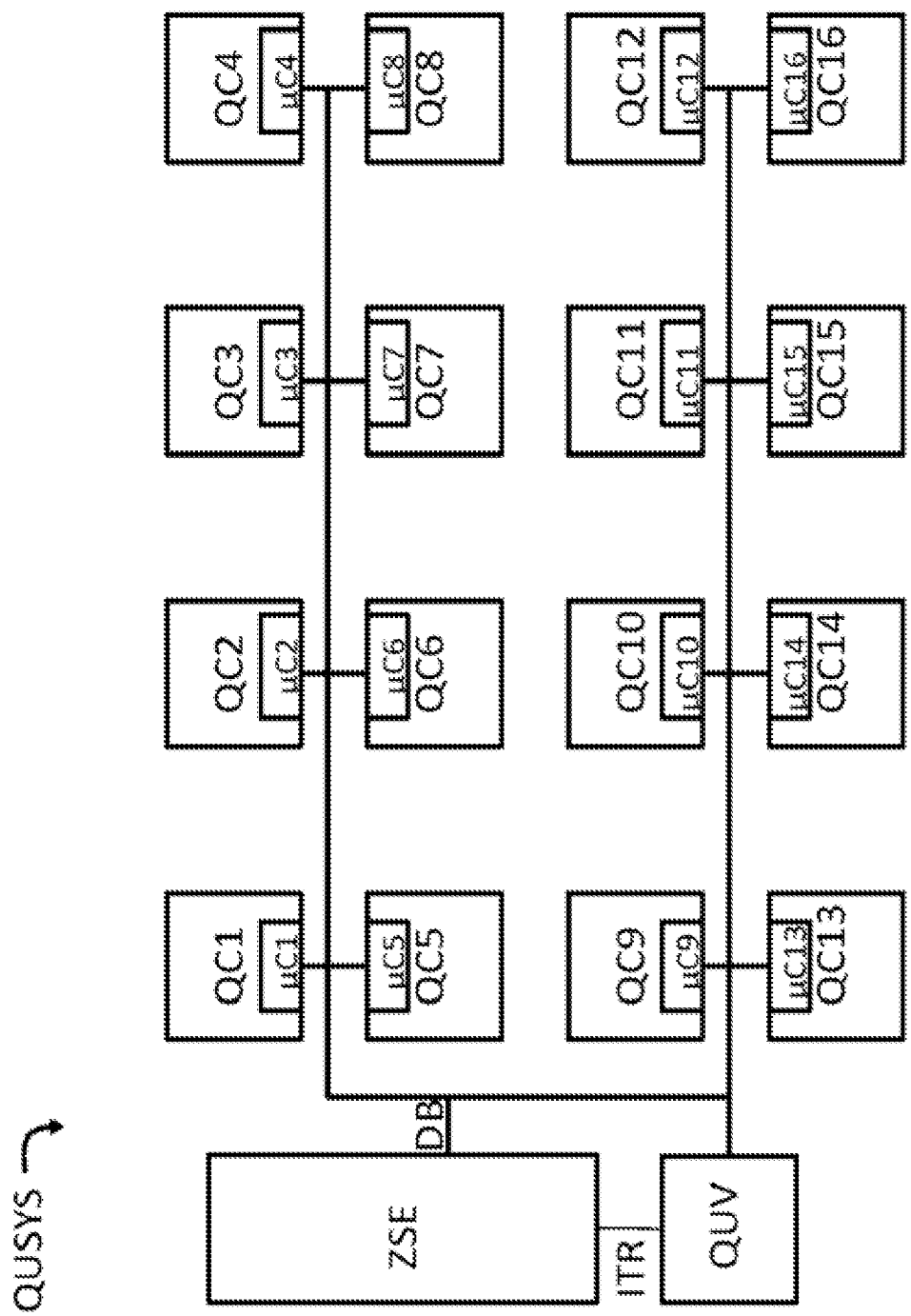
FIG. 2 corresponds to FIG. 1 with the difference that a proposed quantum computer monitoring device (QUV) may now monitor and, if necessary, test the function of the quantum computer.

FIG. 2 corresponds to FIG. 1 with the difference that a quantum computer monitoring device (QUV) may now monitor and, if necessary, test the function of the quantum computers. In particular, in the example in FIG. 2, it may signal a problem to the central control unit via an interrupt line. The central control unit may then, if necessary, read out information about the type of problem from registers of the quantum computer monitoring device (QUV).

Figure 3:
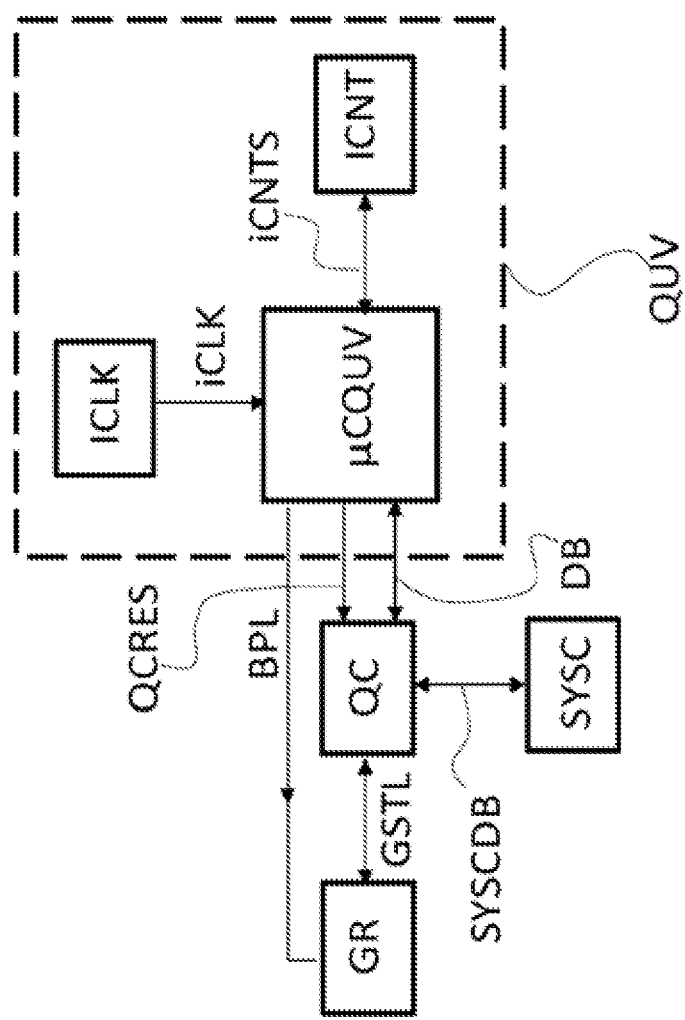
FIG. 3 shows an example of a possible interaction of a single quantum computer (QC) with a quantum computer monitoring device (QUV) and device (GR) and a system component (SYSC).

FIG. 3 shows the possible interaction of a single quantum computer (QC) with a quantum computer monitoring device (QUV) and device (GR) and a system component (SYSC). The control computer (µCQUV) of the quantum computer monitoring device (QUV) monitors the internal clock generator (ICLK) of the quantum computer monitoring device (QUV). The quantum computer (QC) and the quantum computer monitoring device (QUV) exchange data etc. via the data bus (DB). The quantum computer monitoring device (QUV) may detect errors of the quantum computer (QC) and bring the device (GR) into a safe state via a bypass line (BPL) if the quantum computer monitoring device, for example, detects an error of the quantum computer (QC). In the example, the quantum computer (QC) controls and/or regulates additional system components (SYSC) not protected by such a bypass line (BPL) vis exemplary additional signal lines (SYSCDB), which may include a data bus.

The quantum computer monitoring device (QUV) in the example has an internal counter and/or timer (ICNT). For example, this may count the pulses of an internal clock (ICLK) of the quantum computer monitoring device (QUV) between two errors of the quantum computer (QC) or between a start signal and the time of occurrence of an error of the quantum computer (QC) and/or the number of errors of the quantum computer (QC) and/or the number of correct quantum computer calculations of the quantum computer (QC), and/or count the number of erroneous quantum computer calculations of the quantum computer (QC), and/or count the number of quantum computer calculations of the quantum computer (QC) with a specific result, and/or count the number of quantum computer calculations of the quantum computer (QC) that deviate from a specific result. The quantum computer monitoring device (QUV) typically includes more than one internal counter and/or timer (ICNT). Preferably, these multiple internal counters and/or timers (ICNT) detect different counter events, as previously indicated. The above sections are referenced here. In the example in FIG. 3, the control computer (µCQUV) of the quantum computer monitoring device (QUV) signals the occurrence of an event to be counted to the exemplary internal counter and/or timer (ICNT) by means of an internal counter event signal (iCNTS). The internal counter event signal (iCNTS) may also be a gate signal for counting pulses of the internal clock (iCLK) to the exemplary internal counter and/or timer (ICNT).

Figure 4:
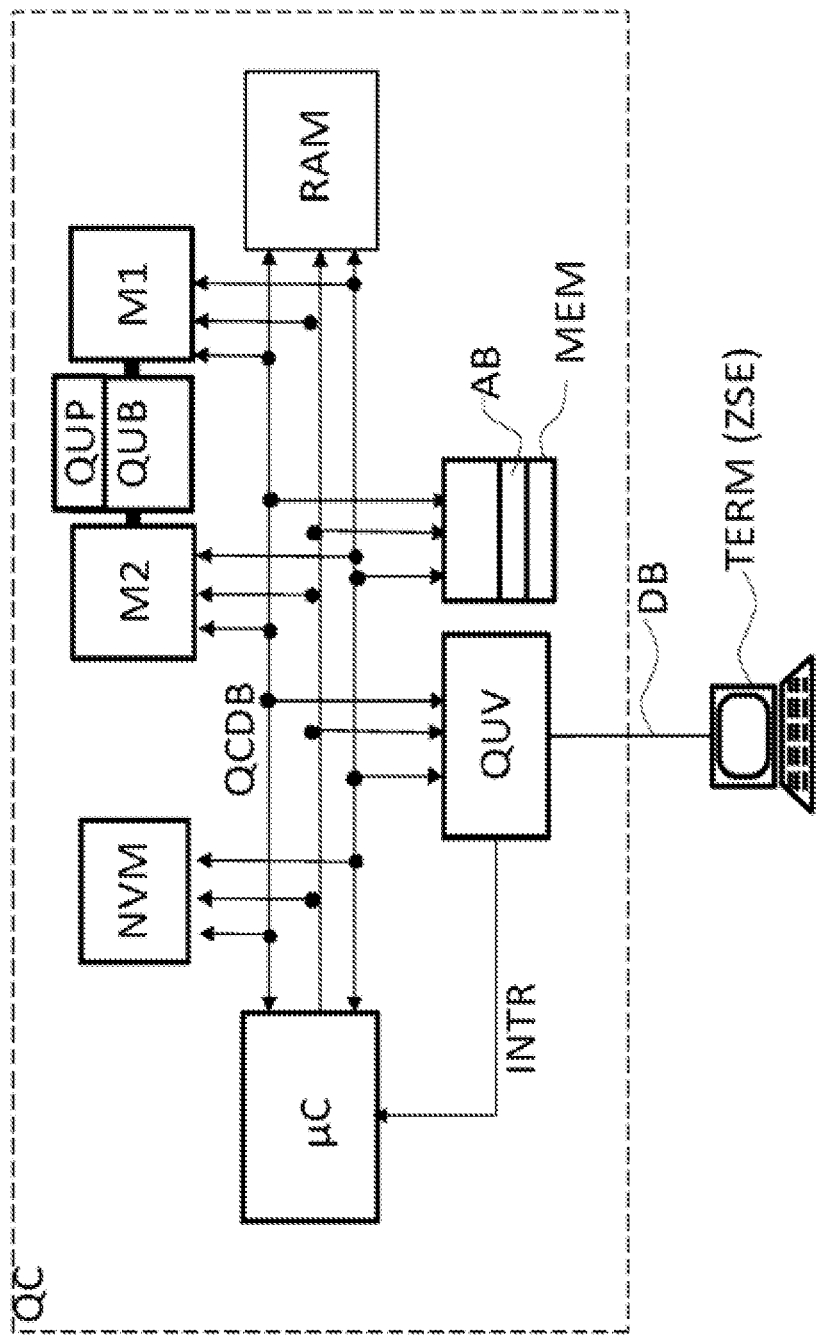
FIG. 4 shows an example situation in which the quantum computer monitoring device (QUV) is part of the quantum computer (QC).

FIG. 4 shows a situation in which a separate quantum computer monitoring device (QUV) is part of the quantum computer (QC). The quantum computer (QC) comprises a control computer (µC), the quantum computer monitoring device (QUV) and a memory (MEM) with a special section (AB) in memory (MEM). Furthermore, the quantum computer (QC) in this example comprises a non-volatile memory (NVM) and a read/write memory (RAM). As the core of the device, the proposed quantum computer (QC) includes one or more quantum bits (QUB). These quantum bits may be, for example, electron spins and/or spins of electron configurations and/or nuclear spins. For example, they may be paramagnetic centers and/or magnetic nuclear moments of atomic nuclei. The document presented here refers to the international patent application WO 2021083448 A1, which was still unpublished at the time of filing the priority patent application DE 102021110964.7 dated Apr. 28, 2021, of the document presented here. In this example, the control computer (µC) of the quantum computer (QC) may manipulate the quantum bits (QUB) with first means (M1) and read out states of the quantum bits (QUB) with second means (M2).

The document presented here also refers to the international patent application WO 2021083448 A1, which was still unpublished at the time of filing the priority patent application DE 102021 110964.7 dated Apr. 28, 2021, of the document presented here. To the extent permitted by the law of any state in which the document presented here is to be nationalized, the technical teaching of WO 2021083448 A1 is fully incorporated in the disclosure of the document presented here. Typically, the quantum computers (QC1 to QC16) of the quantum computer system (QUSYS) include drive units as first means (M1), such as horizontal driver stages (e.g. reference signs HD1 to HD3 of FIG. 23 of WO 2021083448 A1) and/or the vertical driver stages (e.g. reference sign VD1 23 of WO 2021083448 A1), which drive the signal course on the control lines, for example horizontal control lines (e.g. references signs LH1 to LH3 of FIG. 23 of WO 2021083448 A1) and/or horizontal shield lines (e.g. references signs SH1 to SH4 of FIG. 23 of WO 2021083448 A1) and/or, for example, vertical control lines (e.g. reference signs LV1 of FIG. 23 of WO 2021083448 A1) and/or vertical shield lines (e.g. reference signs SV1 to SV2 of FIG. 23 of WO 2021083448 AT). Typically, the quantum computer (QC) includes evaluation units as second means (M2), such as horizontal receiver stages (e.g. reference signs HS1 to HS3 of FIG. 23 of WO 2021083448 A1) and/or the vertical receiver stages (e.g. reference signs VS1 of FIG. 23 of WO 2021083448 A1), which detect and evaluate the signal course on the control lines, for example horizontal control lines (e.g. reference signs LH1 to LH3 of FIG. 23 of WO 2021083448 A1) and/or horizontal shield lines (e.g. reference signs SH1 to SH4 of FIG. 23 of WO 2021083448 A1) and/or, for example, vertical control lines (e.g. reference signs LV1 of FIG. 23 of WO 2021083448 A1) and/or vertical shield lines (e.g. reference signs SV1 to SV2 of FIG. 23 of WO 2021083448 A1). For example, via a test bus as a data bus (DB), a terminal (TERM) as a central control unit (ZSE) may access the system of the quantum computer (QC) and, for example, interrupt the processing of the quantum computer program at specific times and/or quantum computer program points and/or quantum computer program addresses and/or specific quantum operations.

In this example, the control computer (µC), the non-volatile memory (NVM), the first means (M1), the second means (M2), the memory (MEM), the volatile memory (RAM) and the quantum computer monitoring device (QUV) are connected to a common quantum computer data bus (QCDB), which in this example is completely inside the quantum computer (QC). The quantum computer monitoring device (QUV) of the quantum computer (QC) here may influence the control computer (µC) via an interrupt line (INTR). Ultimately, the document presented here discloses a quantum computer monitoring device (QUV) of a quantum computer system (QUSYS) and a quantum computer monitoring device (QUV) of a quantum computer (QC), wherein the transitions are obviously smooth. A quantum computer system (QUSYS) may thus, for example, include a quantum computer monitoring device (QUV) of the quantum computer system (QUSYS) and/or one or more quantum computers (QC1 to QC16), each having, for example, one or more quantum computer monitoring devices (QUV) of these quantum computers (QC)

Features

The feature list reflects the features of the proposal. The features and their sub-features may be combined with each other and with other features and sub-features of this proposal and with features of the description, to the extent that the result of such combination is meaningful. For this purpose, in the case of a combination, it is not necessary to include all sub-features of a feature in one feature. The technical effects and advantages are mentioned in the previous description and below.

1. Quantum Computer System (QUSYS),
   wherein the quantum computer system (QUSYS) comprises a quantum computer (QC), and
   wherein the quantum computer system (QUSYS) comprises a quantum computer monitoring device (QUV), and
   wherein the quantum computer (QC) executes a quantum computer program with a quantum computer program flow, and
   wherein the quantum computer program typically comprises at least one quantum operation under manipulation of a quantum state of at least one quantum bit (QUB) of the quantum computer (QC), and
   wherein the quantum computer monitoring device (QUV) monitors the correct quantum computer program flow of the quantum computer program of the quantum computer (QC), and/or
   wherein the quantum computer monitoring device (QUV) monitors exactly one of more than exactly one value and/or exactly one and/or more than exactly one value course of one of the following operating parameters:
   a value of an operating voltage of an operating voltage line (VDD) of the quantum computer system (QUSYS) relative to a reference potential (GND), and/or
   a value of a current consumption (IDD) of the quantum computer system (QUSYS) correlated with this operating voltage line (VDD), and/or
   a value of an operating voltage of an operating voltage line (VDD) of the quantum computer (QC) relative to a reference potential (GND), and/or
   a value of a current consumption (IDD) of the quantum computer (QC) correlated with this operating voltage, and/or
   a value of an operating voltage of a device part of the quantum computer (QC) relative to a reference potential (GND), and/or
   a value of a current consumption of a device part of the quantum computer (QC) correlated with this operating voltage, and/or
   the processor clock (QCCLK) of a control computer (µC), which might be a part of the quantum computer (QC), and/or
   the value of the frequency of the processor clock (QCCLK) of the control computer (µC), which might be a part of the quantum computer (QC), and/or
   the light output of a light source (LED) of a quantum computer (QC) for irradiating quantum bits (QUB) of the quantum computer (QC) with radiation,
   the detection capability of electromagnetic radiation of a photodetector, and/or
   the expected correct generation of electromagnetic fields, in particular microwave fields and/or radio wave fields, of a device of the quantum computer (QC) for manipulating one or more quantum bits (QUB), and/or the complex and/or real and/or imaginary conductance of a line that is part of a device of the quantum computer (QC) for manipulating one or more quantum bits (QUB).

Advantage of this feature: by monitoring these operating parameters, the quantum computer monitoring device (QUV) ensures that the prerequisites are met that the quantum computer (QC) or the quantum computers (QC1 to QC16) of the quantum computer system (QUSYS) are be able to provide the expected quantum computer calculation results. For this purpose, the quantum computer monitoring device (QUV) determines measured values for the monitored operating parameters and compares them with threshold values and/or predetermined tolerance intervals for the measured values of these operating parameters. If the measured values are in value ranges that are marked as permissible by the threshold values and/or the predetermined tolerance intervals, then the quantum computer monitoring device (QUV) typically does nothing. This may be the case, for example, when measured values are within a predetermined tolerance interval. If the measured values are outside the value ranges that are marked as permissible by the threshold values and/or the predetermined tolerance intervals, then the quantum computer monitoring device (QUV) typically initiates countermeasures and, if necessary, also carries them out itself. Here, this may be, for example, signaling to a higher-level central control unit (ZSE), a user display, or a resetting of the relevant quantum computer (QC) and/or the quantum computer system (QUSYS). Other measures of the quantum computer monitoring device (QUV) are also conceivable in this case.

Feature 2: Quantum Computer System (QUSYS) According to Feature 1, wherein the quantum computer (QC) performs predetermined quantum computer calculations with at least one quantum operation under manipulation of at least one quantum bit (QUB) of the quantum computer (QC) in predetermined time periods before predetermined time points (tv) to calculate predetermined quantum computer calculation results, and wherein the quantum computer (QC) has to drive the quantum computer monitoring device (QUV) after these predetermined time points (tv), since the quantum computer monitoring device (QUV) otherwise performs one or more countermeasures.

Advantage of this feature: quantum computers (QC, QC1 to QC16) perform the quantum calculations within the so-called T2 time, in which it may be assumed that the probability that an entanglement and/or coherence of quantum stares has not been lost is very high. Therefore, quantum computers (QC) preferably perform quantum calculations in time slices. Here, each time slice preferably has a duration that is shorter than the shortest T2 time of the quantum bits involved. In a quantum computer (QC, QC1 to QC16), these time slices for calculating quantum computer calculations are chronologically consecutive and do not overlap in time. A core idea of the technical teaching presented here is that the quantum computer (QC, QC1 to QC16) performs a quantum calculation by means of a quantum computer program in a first time slice and signals to the quantum computer monitoring device (QUV) in a typically subsequent second time slice that it is still functioning. For example, the quantum computer (QC, QC1 to QC16) may perform typically simple quantum computer calculations predetermined by the quantum computer monitoring device (QUV) in this second time slice, and signal the results of these quantum computer calculations to the quantum computer monitoring device (QUV) in this second time slice. The quantum computer monitoring device (QUV) may perform statistics on the quantum computer calculation results of the relevant quantum computer (QC, QC1 to QC16) and infer that there is an error in the relevant quantum computer (QC, QC1 to QC16) if these quantum computer calculation results of this quantum computer (QC, QC1 to QC16) for this repeatedly performed quantum computer calculation statistically deviates from a statistically determined result value of this quantum computer calculation results by more than a preset value, i.e. more frequently than expected.

Feature 3: Quantum Computer System (QUSYS) According to Feature 2, wherein the countermeasure performs a reset (reset function) of the quantum computer (QC) to the quantum computer program start (QPS) or another predetermined quantum computer program point (QPV) or the like.

Advantage of this feature: by such a measure, the quantum computer monitoring device (QUV) brings the quantum computer (QC) to a defined state again when its operation has been disturbed by external physical events, such as ionizing radiation, electromagnetic radiation or thermal disturbances.

Feature 4: Quantum Computer (QC) According to One or More of Features 1 to 3, wherein the quantum computer (QC) comprises a data bus (DB), and wherein the data bus (DB) couples the quantum computer (QC) to the quantum computer monitoring device (QUV), and wherein the quantum computer (QC) can transmit information and/or quantum computer calculation results to the quantum computer monitoring device (QUV) via the data bus (DB), and/or wherein the quantum computer monitoring device (QUV) can transmit information and/or requests and/or program codes and/or program data to the quantum computer (QC) via the data bus (DB).

Advantage of this feature: by such a measure, the quantum computer monitoring device (QUV) may also monitor a plurality of quantum computers (QC, QC1 to QC16), if necessary.

Feature 5: Quantum Computer System (QUSYS) According to One or More of Features 2 to 4, wherein the quantum computer (QC) has to drive the quantum computer monitoring device (QUV) after the predetermined time points (tv), and wherein the quantum computer (QC) transmits at least one quantum computer calculation result of a predetermined quantum computer calculation to the quantum computer monitoring device (QUV) upon this driving.

Advantage of this feature: as a result, the quantum computer monitoring device (QUV) may record the function of the quantum operations of the monitored quantum computer (QC) and, for example, create a corresponding log file.

Feature 6: Quantum Computer System According to Feature 5, wherein the quantum computer monitoring device (QUV) verifies the quantum computer calculation result of the quantum computer (QC).

Advantage of this feature: as a result, the quantum computer monitoring device (QUV) may monitor the function of the quantum operations of the quantum computer (QC) and, if necessary, initiate or take measures.

Feature 7: Quantum Computer System (QUSYS) According to Feature 6,
- wherein the quantum computer monitoring device (QUV) infers that the quantum computer (QC) is in an error state if the quantum computer calculation result of the quantum computer (QC) is not within a predetermined allowed solution set for the quantum computer calculation result of the quantum computer (QC).

Advantage of this feature: as a result, the quantum computer monitoring device (QUV) may ensure the correct function of the quantum computer system (QUSYS) and its quantum computers (QC, QC1 to QC16).

Feature 8: Quantum Computer System (QUSYS) According to One or More of Features 6 to 7,
- wherein the quantum computer monitoring device (QUV) creates a statistic of a plurality of quantum computer calculation results of similar quantum computer calculations of the quantum computer (QC, QC1 to QC16) and infers that there is an error if the quantum computer calculation results of the quantum computer (QC, QC1 to QC16) deviate from an expected quantum computer calculation result of the quantum computer (QC, QC1 to QC16) more frequently than a predetermined maximum value.

Advantage of this feature: as a result, the quantum computer monitoring device (QUVV) may ensure the correct function of the quantum computer system (QUSYS), although the results of the quantum computer calculations are only results that assume the correct values with a certain statistical probability. This problem in particular cannot be solved with devices from the prior art.

Feature 9: Quantum Computer System (QUSYS) According to Feature 8,
- wherein the quantum computer monitoring device (QUV) has a memory, and
- wherein a value is and/or can be stored in the memory of the quantum computer monitoring device (QUV) which corresponds to the maximum value by which the quantum computer calculation results of the quantum computer (QC) are allowed to deviate maximally frequently from an expected quantum computer calculation result of the quantum computer (QC).

Advantage of this feature: this tolerance specification is advantageous so that the quantum computer monitoring device (QUV) is optimally adjusted depending on the performed quantum computer calculation. That is because the spread width of the results of the quantum computer calculations of the quantum computer (QC) varies depending on the performed quantum computer calculation.

Feature 10: Quantum Computer System (QUSYS) According to One or More of Features 7 to 9,
- wherein in the event of inferring an error, the quantum computer monitoring device (QUV) signals the occurrence of this error to the quantum computer (QC) or a higher-level system (ZSE) and/or provides information about this error.

Advantage of this feature: in many applications, quantum computer systems (QUSYS) will be used in potentially safety-relevant overall systems. Such systems are evaluated in the design phase with a so-called FEMA analysis. By establishing the observability of an error in a quantum computer system (QUSYS) or the observability of an error in a quantum computer (QC, QC1 to QC16) of a quantum computer system (QUSYS), the severity of the consequence of such an error reduces. This reduction in the severity of the error is already sufficient in a number of typical use cases to actually allow such systems to be used in real life.

Feature 11: Quantum Computer System (QUSYS) According to One or More of Features 1 to 10,
- wherein quantum computer system (QUSYS) comprises a higher level system (ZSE), and
- wherein the quantum computer system (QUSYS) comprises a plurality of quantum computers (QC, QC1 to QC16), and
- wherein the higher-level system (ZSE) for at least one quantum computer (QC), preferably for all quantum computers (QC, QC1 to QC16) respectively has a memory with a respective error counter value which is correlated to the respective quantum computer (QC, QC1 to QC16).

Advantage of this feature: according to experience, temporary disturbances of the quantum computer system (QUSYS) or the quantum computers (QC, QC1 to QC16) of the quantum computer system (QUSYS) may occur now and then. Thus, the severity of the disturbance also depends on the timing of the occurrence of such disturbances. Therefore, it is useful if the quantum computer monitoring device (QUV) detects this temporal density and if the measures taken or initiated by the quantum computer monitoring device (QUV) depend on this temporal density of disturbances of the quantum computer system (QUSYS) and/or the quantum computer (QC, QC1 to QC16).

Feature 12: Quantum Computer System (QUSYS) According to Feature 11,
- wherein the higher-level system (ZSE) increases the error counter value correlated with a quantum computer (QC) by a first error counter increment when the quantum computer monitoring device (QUV) signals a presumed error of the quantum computer (QC) correlated with the error counter value.

Advantage of this feature: here, the counter reading is not increased for every error, but only for errors that result in signaling. Thus, the temporal density detection of errors is limited to particularly serious errors of specific error classes. The quantum computer monitoring device (QUV) thus refrains from unnecessarily increasing the countermeasures or, if necessary, omits them entirely because they may be unnecessary.

Feature 13: Quantum Computer System (QUSYS) According to Feature 11 and/or Feature 12,
- wherein the higher level system (ZSE) decreases the error counter value correlated with a quantum computer (QC) by a second error counter increment when the quantum computer monitoring device (QUV) signals an assumed correctness of a quantum computer calculation result of the quantum computer (QC) correlated with the error counter value.

Advantage of this feature: in this way, the quantum computer monitoring device (QUV) ensures that when a temporary error disappears, error events from a long time ago no longer have any influence.

Feature 14: Quantum Computer System (QUSYS) According to One or More of Features 11 to 13,
- wherein the higher-level system, in particular a central control unit (ZSE), in the case when not all quantum computers (QC, QC1 to QC16) of the quantum computer system (QUSYS) are required for a quantum calculation task to be performed by the quantum computer system (QUSYS), uses the quantum computers (QC, QC1 to QC16) of the quantum computer system (QUSYS) with the respective lowest current error counter values correlated to the respective quantum computers (QC, QC1 to QC16) to execute the calculation task.

Advantage of this feature: because the quantum computer monitoring device (QUSYS) ensures this through appropriate signaling to the device parts of the quantum computer system (QUSYS), the quality of the quantum computer calculation result of the quantum computer system (QUSYS) is always maximized and the error rate is always minimized. Such a quantum computer system (QUSYS), for example, preferably uses the quantum bits with the highest fidelity and the longest T2 times for the calculations in order to obtain the lowest possible error rate.

Feature 15: Quantum Computer System (QUSYS) According to One or More of Features 10 to 14,
  wherein the signaling of the quantum computer monitoring device (QUV)
  resets the quantum computer (QC), and/or
  brings the quantum computer (QC) into a predetermined state, and/or
  brings at least one quantum bit (QUB) of the quantum computer (QC) into a predetermined state, and/or
  brings at least one nuclear quantum bit (QUB) of the quantum computer (QC) into a predetermined stare and/or
  brings at least one quantum register (QUREG) of the quantum computer (QC) into a predetermined state, and/or
  brings at least one nuclear quantum register (CQUREG) of the quantum computer (QC) into a predetermined state, and/or
  brings at least one nuclear-electron quantum register (CEQUREG) of the quantum computer (QC) into a predetermined state.

Advantages of this feature: the above feature lists some of the possible countermeasures that the quantum computer monitoring device (QUV) may take when the quantum computer monitoring device (QUV) infers that the quantum computer system (QUSYS) or device parts of the quantum computer system (QUSYS) is in an unintended state. In the simplest case, the measures of the quantum computer monitoring device (QUV) are limited to the relevant device parts of the quantum computer system (QUSYS).

Feature 16: Quantum Computer System (QUSYS) According to Feature 15,
  wherein in the event of a reset, the quantum computer (QC) brings its quantum bits (QUB) and/or part of its quantum bits (QUB) into a predetermined combination of superimposed quantum states.

Advantage of this feature: this measure of the quantum computer monitoring device (QUV) ensures that subsequent quantum computer calculations may restart from a defined state of these quantum bits (QUB), if necessary.

Feature 17: Quantum Computer System (QUSYS) According to Feature 15 and/or 16,
  wherein in the event of a reset, the quantum computer (CQ) brings its nuclear quantum bits (CQUB) and/or part of its nuclear quantum bits (CQUB) into a predetermined combination of superimposed quantum states.

Advantage of this feature: this measure of the quantum computer monitoring device (QUV) ensures that subsequent quantum computer calculations may restart from a defined state of these nuclear quantum bits (CQUB), if necessary.

Feature 18: Quantum Computer System (QUSYS) According to One or More of Features 6 to 17,
  wherein the quantum computer (QC) carries out a targeted error drive of the quantum computer monitoring device (QUV), in particular by transmitting an erroneous quantum computer calculation result, in the event that a malfunction recognized by the quantum computer (QC) itself or by the control computer (µC) of the quantum computer (QC) itself occurs to trigger a reset function of the quantum computer (QC) that can be triggered by the quantum computer monitoring device (QUV).

Advantage of this feature: this measure of the quantum computer monitoring device (QUV) ensures that a check of the higher-level system for correct response to an error of a quantum computer (QC) and/or the quantum computer system (QC) may be verified in operation.

Feature 19: Quantum Computer System (QUSYS) According to Feature 18, Characterized in that,
  the quantum computer (QC) performs the error drive by:
  the quantum computer (QC) drives the quantum computer monitoring device (QUV), in particular by transmitting an incorrect and/or correct quantum computer calculation result, within a predetermined and/or predeterminable time span more frequently than a predetermined and/or predeterminable maximum number for this time span.

Advantage of this feature: sending a message too often may also indicate an error that may be detected in this way.

Feature 20: Quantum Computer System (QUSYS) According to One or More of Features 4 to 19,
  wherein the quantum computer monitoring device (QUV) infers that there is an error if the quantum computer (QC) transmits a quantum computer calculation result to the quantum computer monitoring device (QUV) before a predetermined second time point (t2),
  wherein this predetermined second time point (t2) is after the predetermined time point (tv) or equal to the predetermined time point (tv).

Advantage of this feature: sending a message too early may also indicate an error that may be detected in this way.

Feature 21: Quantum Computer System (QUSYS) According to One or More of Features 4 to 20,
  wherein the quantum computer monitoring device (QUV) infers that there is an error if the quantum computer (QC) transmits a quantum computer calculation result to the quantum computer monitoring device (QUV) after a predetermined third time point (t3),
  wherein this predetermined third time point (t3) is after the predetermined time point (tv) or equal to the predetermined time point (tv).

Advantage of this feature: sending a message too late may also indicate an error that may be detected in this way.

Feature 22: Quantum Computer System (QUSYS) According to One or More of Features 1 to 21,
  wherein the quantum computer monitoring device (QUV) signals to the quantum computer (QC) before the start of a predetermined time period (Tv) which predetermined quantum computer calculation or which predetermined quantum computer calculations the quantum computer (QC) should perform.

Advantage of this feature: in this way, the quantum computer monitoring device (QUV) may systematically perform various tests and detect the corresponding errors. Thus, the quantum computer monitoring device (QUV) maximizes the error coverage of the tests preferably executed by the quantum computer monitoring device (QUV).

Feature 23: Quantum Computer System (QUSYS) According to One or More of Features 1 to 22, wherein the quantum computer monitoring device (QUV) signals the beginning and, if necessary, the end of the duration of the predetermined time period (Tv) to the quantum computer (QC).

Advantage of this feature: for example, the quantum computer monitoring device (QUV) may thus cause the quantum computer (QC) to take measures on its own if it does not respond to the request from the quantum computer monitoring device (QUV) in a timely manner. It is therefore expressly not absolutely necessary for the quantum computer monitoring device (QUV) to initiate the measures. Rather, the control computer (μC) of the quantum computer (QC') may also initiate a corresponding measure if the time to response a request from the quantum computer monitoring device (QUV) has elapsed.

Feature 24: Quantum Computer System (QUSYS) According to One or More of Features 1 to 23, Characterized in that,
the quantum computer (QC) monitors for a malfunction in itself and/or in other components and/or sub-devices of the quantum computer system (QUSYS).

Advantage of this feature: in particular, the control computer (μC) of a quantum computer (QC) may work as a quantum computer monitoring device (QUV) for another quantum computer (QC) in a quantum computer system (QUSYS). A plurality of quantum computers (QC, QC1 to QC16) of a quantum computer system (QUSYS) may monitor each other in this way. Here, each quantum computer of the quantum computers (QC, QC1 to QC16) of the quantum computer system (QUSYS) acts at least temporarily as a quantum computer monitoring device (QUV) for another quantum computer of the quantum computers (QC, QC1 to QC16) of the quantum computer system (QUSYS) respectively.

Feature 25: Quantum Computer System (QUSYS) According to One or More of Features 1 to 24, Characterized in that,
the quantum computer monitoring device (QUV) monitors for a malfunction in itself and/or in other components and/or sub-devices of the quantum computer system (QUSYS).

Advantage of this feature: preferably, the control computer (μC) of a quantum computer (QC) works as a quantum computer monitoring device (QUV) with regard to various device parts of this quantum computer (QC). In addition, it preferably also works at least temporarily as a quantum computer monitoring device (QUV), which is connected to the control computer (μC) of the quantum computer (QC), for example via a data bus (DB). In this way, the control computer (μC) maximizes the test coverage of monitoring of the quantum computer (QC).

Feature 26: Quantum Computer System (QUSYS) According to One or More of Features 1 to 25, Characterized in that
the quantum computer monitoring device (QUV) is a quantum computer (QC) that includes at least two quantum bits.

Advantage of this feature: this feature is in principle the inverse of the above features, where the quantum computer monitoring device (QUV) may now also perform quantum operations and, for example, may compare their results with those of the monitored quantum computers (QC, QC1 to QC16) of the quantum computer system (QUSYS).

Feature 27: Device for Monitoring a Quantum Computer (QC), in Particular for Use in a Quantum Computer System (QUSYS) According to One or More of Features 1 to 26,
wherein the device comprises a quantum computer monitoring device (QUV), and
wherein the quantum computer (QC) comprises an internal clock (ICLK), and
wherein the quantum computer (QC) is connectable and/or connected to a quantum computer monitoring device (QUV), in particular via a data bus (DB) or special signal lines, for monitoring the quantum computer (QC), and
wherein the quantum computer monitoring device (QUV) is connectable and/or connected to the internal clock (ICLK) for monitoring a system clock of the quantum computer (QC), and/or
wherein the quantum computer monitoring device (QUV) comprises means for verifying the quantum computer program flow of the quantum computer program of the quantum computer (QC), and/or
wherein the quantum computer monitoring device (QUV) comprises means for verifying the correctness of the function of the quantum computer (QC), and/or
wherein the quantum computer monitoring device (QUV) comprises means for verifying the correct execution of manipulations of quantum bits (QUB) of the quantum computer (QC).

Advantage of this feature: such a quantum computer monitoring device (QUV) already intercepts the essential errors of a quantum computer of the quantum computers (QC, QC1 to QC16) of the quantum computer system (QUSYS).

Feature 28: Device According to Feature 27,
wherein the quantum computer monitoring device (QUV) comprises means for monitoring operating parameters of the quantum computer (QC), such as the magnetic field and/or the irradiation of electromagnetic waves and/or the temperature and/or the irradiation, and
wherein the quantum computer monitoring device (QUV) comprises means for monitoring tests of system components (SYSC) of the quantum computer (QC), and
wherein the quantum computer monitoring device (QUV) transmits an error message to the quantum computer (QC) when at least one error is recognized and increments or decrements or changes an error counter in a predetermined manner.

Advantage of this feature: this feature has the advantage that in the event of temporary disturbances of the monitored quantum computer (QC) due to fluctuations of these operating parameters, the quantum computer monitoring device (QUV) does not have to take any serious measures immediately.

Feature 29: Device According to Feature 28, Characterized in that,
the quantum computer monitoring device (QUV) transmits test questions to the quantum computer (QC) when verifying the quantum computer program, and
the quantum computer monitoring device (QUV) monitors responses of the quantum computer (QC) for correctness and/or time point and/or statistical correctness, and
the calculation of the responses to the test questions requires at least one manipulation of a state of a quantum bit of the quantum computer (QC) and/or at least one quantum operation of the quantum computer (QC).

Here, a quantum operation is typically an operation of the monitored quantum computer (QC) that modifies the quantum state of at least one quantum bit of at least one quantum register of the quantum computer (QC).

Advantage of this feature: as a result, the quantum computer monitoring device (QUV) is able to check the correct function of the monitored quantum computer (QC) and also to monitor the utilization of the control computer (μC). If this is too high, the quantum computer (QC) responds too slowly. If the quantum bits of the quantum computer (QC) or their control means within the quantum computer (QC) are damaged or in illegal states, the transmitted responses of the quantum computer (QC) typically do not match expected values and/or expected value ranges.

Feature 30: Device According to Feature 28 or 29, Characterized in that,
  when monitoring the tests of the system components, the quantum computer monitoring device (QUV) transmits test commands to the quantum computer (QC), and
  the quantum computer (QC) sends a quantum computer calculation result corresponding to the test question back to the quantum computer monitoring device (QUV), which the quantum computer monitoring device (QUV) monitors for correctness and time point and/or statistical correctness.

Advantage of this feature: as a result, the quantum computer monitoring device (QUV) is able to check the correct function of the monitored quantum computer (QC) and also to monitor the utilization of the control computer (µC). If this is too high, the quantum computer (QC) responds too slowly. If the quantum bits of the quantum computer (QC) or their control means within the quantum computer (QC) are damaged or in illegal states, the transmitted responses of the quantum computer (QC) typically do not match expected values and/or expected value ranges.

Feature 31: Device According to One of the Preceding Features 28 to 30, Characterized in That☐
  when at least one error is recognized, the quantum computer monitoring device (QUV) causes a device (GR) connected to the quantum computer (QC) to
  lock its function for a predetermined time period, or
  bring it to a safe state, or
  prevent the quantum computer (QC) from accessing the device (GR), or
  connect the device (GR) to a quantum computer simulation device instead of to the quantum computer (QC),
  wherein the quantum computer monitoring device (QUV) is preferably directly connectable to the device (GR).

Advantage of this feature: this feature describes different ways of the reaction of the quantum computer monitoring device (QUV) to an error of the quantum computer (QC). In order to enable emergency operation, the device may use a quantum computer simulation. Such a simulation may also be a quantum computer program flow with fewer quantum bits. However, the limitations of such simulations are well known.

Feature 32 Device According to Feature 30 or 31, Characterized in that,
  the quantum computer monitoring device (QUV) extends the locking of the device (GR) or the assumption of the safe state by the device (GR), if the quantum computer monitoring device (QUV) recognizes at least one other error in the quantum computer (QC) during the locking of the device (GR) or while the device (GR) is in the safe state.

Advantage of this feature: if the quantum computer monitoring device (QUV) recognizes that the error is a persistent error, the quantum computer monitoring device (QUV) prevents the quantum computer (QC) from causing the utilization system controlled by the quantum computer (QC) in erroneous unsafe states.

Feature 33: device according to one of the preceding features 27 to 32, characterized in that,
  when the error counter has reached a predetermined value, the quantum computer monitoring device (QUV) causes the device (GR) to be blocked or the device (GR) to assume a safe state until the quantum computer monitoring device (QUV) is switched off.

Advantage of this feature: only when the severity of the error is so great that it occurs repeatedly, the unreliability of the quantum computer (QC) become so great that the strict measure of total shutdown is taken only then, rather than being taken when the event occurs once.

Feature 34: Device According to One of the Preceding Features 27 to 33, Characterized in that,
  the device (GR) connectable to the quantum computer (QC) is a system of a vehicle, a flying body or a floating body or a robot or an airplane or a satellite or a weapon system.

Advantage of this feature: this feature describes typical applications for such devices.

Feature 35: Device According to One of the Preceding Features 27 to 34, Characterized in that,
  the quantum computer monitoring device (QUV) causes the device (GR) to be locked and/or the device (GR) to assume a safe state when switched on, until the quantum computer monitoring device (QUV) recognizes correctness, in particular in the points of feature 0.

Advantage of the claim: by taking this approach, the quantum computer monitoring device (QUV) ensures that the entire system may be in a safe state from the start.

Feature 36: Device According to One of the Preceding Features 27 to 35, Characterized in that,
  the error counter and individual errors can be read out from the quantum computer monitoring device (QUV) by the quantum computer (QC).

Advantage of this feature: with this feature, for example, the control computer (µC) of the quantum computer (QC) may transmit the current state of the quantum computer monitoring device (QUV) to a higher-level central control unit (ZSE).

Feature 37: Device According to One of Features 28 to 36, Characterized in that,
  the quantum computer monitoring device (QUV) determines the time points of the responses of the quantum computer (QC) and the task confirmations by at least one internal counter (ICNT) or timer.

Advantage of this feature: the quantum computer monitoring device (QUV) may detect and/or statistically evaluate this data and/or communicate it to a higher-level central control unit (ZSE) or to the control computer (µC) of the quantum computer (QC).

Feature 38: Device According to One or More of Features 27 to 37, Characterized in that,
  a response of the quantum computer (QC) depends on at least one manipulation of a quantum bit of the quantum computer (QC).

Advantage of this feature: only in this way can the quantum computer monitoring device (QUV) verify the correct function of the quantum computer (QC).

Feature 39: quantum computer system (QUSYS), in particular according to one or more of the preceding features 1 to 38,
  where the quantum computer system (QUSYS) comprises at least two quantum computers (e.g. QC1, QC2) of the quantum computers (QC1 to QC16) of the quantum computer system (QUSYS), here an exemplary first quantum computer (QC1), and
  an exemplary second quantum computer (QC2),
  wherein a signaling can take place from the first quantum computer (QC1) to the second quantum computer (QC2) via at least one signal connection (DB).

Advantage of this feature: this is particularly advantageous if the quantum computers (QC1, QC2) within the quantum computer system (QUSYS) are to monitor each other.

Feature 40: Quantum Computer System (QUSYS) According to Feature 39,
  wherein the signaling is a quantum computer calculation result, and
  wherein a quantum computer calculation result is the calculation result of the first quantum computer (QC1) by means of at least one manipulation of a quantum bit of this first quantum computer (QC1).

Advantage of this feature: this is particularly advantageous if the quantum computers (QC1 to QC16) within the quantum computer system (QUSYS) are to monitor each other. The features presented here enable the respective other quantum computer, for example the second quantum computer (QC2), to evaluate whether the quantum operations of the first quantum computer (QC1) are running correctly. The examples described here in this document mainly relate to the first quantum computer (QC1) and the second quantum computer (QC2). The technical teaching can typically always be transferred to other pairings consisting of two quantum computers of the quantum computers (QC1 to QC16) of the quantum computer system (QUSYS).

Feature 41: Quantum Computer System (QUSYS) According to Feature 40,
  wherein the second quantum computer (QC2) compares the quantum computer calculation result of the first quantum computer (QC1) with an expected value.

Advantage of this feature: this is particularly advantageous if the quantum computers (QC1, QC2) within the quantum computer system (QUSYS) are to monitor each other. The features presented here enable the respective other quantum computer, the second quantum computer (QC2), to evaluate whether the quantum operations of the other quantum computer, the first quantum computer (QC1), are running correctly.

Feature 42: Quantum Computer System (QUSYS) According to Feature 41,
  wherein the expected value is the quantum computer calculation result of a quantum computer calculation of the second quantum computer (QC2) or another quantum computer of the quantum computers (QC1 to QC16) of the quantum computer system (QUSYS).

Advantage of this feature: this is particularly advantageous if the quantum computers (QC1, QC2) within the quantum computer system (QUSYS) are to monitor each other. The features presented here enable the respective other quantum computer, the second quantum computer (QC2), to evaluate whether the quantum operations of the other quantum computer, the first quantum computer (QC1), are running correctly. Here the monitoring second quantum computer (QC2) itself generates the reference result. Preferably, it refers to other results of other quantum computers (QC1 to QC16) of the quantum computer system (QUSYS). The first quantum computer (QC1) and the second quantum computer (QC2) can also swap roles.

Feature 43: Quantum Computer System (QUSYS) According to Feature 41 or 42,
  wherein the second quantum computer (QC2) verifies the quantum computer calculation result of the quantum computer (QC1).

Advantage of this feature: this is particularly advantageous if the quantum computers (QC1, QC2) within the quantum computer system (QUSYS) are to monitor each other. The features presented here enable the respective other quantum computer, the second quantum computer (QC2), to evaluate whether the quantum operations of the other quantum computer, the first quantum computer (QC1), are running correctly.

Feature 44: Quantum Computer System (QUSYS) According to Feature 43,
  wherein the second quantum computer (QC2) infers that the first quantum computer (QC1) is in an error state if the quantum computer calculation result of the first quantum computer (QC1) is not within a predetermined allowed solution set for the quantum computer calculation result of the first quantum computer (QC1).

Advantage of this feature: this is particularly advantageous if the quantum computers (QC1, QC2) within the quantum computer system (QUSYS) are to monitor each other. The features presented here enable the respective other quantum computer, the second quantum computer (QC2), to evaluate whether the quantum operations of the other quantum computer, the first quantum computer (QC1), are running correctly and enable the monitoring second quantum computer (QC2) to perform or initiate countermeasures in the event of errors.

Feature 45: Quantum Computer System (QUSYS) According to Feature 43 or 44,
  wherein the second quantum computer (QC2) creates a statistic of a plurality of results of similar quantum computer calculations of the first quantum computer (QC1) and infers that there is an error, in particular in the first quantum computer (QC1), if the quantum computer calculation results of the first quantum computer (QC1) deviate from an expected quantum computer calculation result of the first quantum computer (QC1) more frequently than a predetermined maximum value.

Advantage of this feature: this is particularly advantageous if the quantum computers (QC1, QC2) within the quantum computer system (QUSYS) are to monitor each other. The features presented here enable the respective other quantum computer, the second quantum computer (QC2), to evaluate whether the quantum operations of the other quantum computer, the first quantum computer (QC1), are running statistically correctly. This solves the problem that quantum computer calculation results only deliver values determined with a certain statistical probability. A deviation is not yet an error as long as the statistical distribution essentially corresponds to an expected distribution.

Feature 46: Quantum Computer System (QUSYS) According to One or More of Features 43 to 45,
  wherein the second quantum computer (QC2) creates a first statistic of a plurality of results of similar quantum computer calculations of the first quantum computer (QC1) and infers that there is an error if the quantum computer calculation results of the first quantum computer (QC1) deviate from a second statistic of a plurality of results of corresponding similar quantum computer calculations of the second quantum computer (QC2) or another quantum computer more frequently than a predetermined maximum value.

Advantage of this feature: this is particularly advantageous if the quantum computers (QC1, QC2) within the quantum computer system (QUSYS) are to monitor each other. Here, they preferably apply statistical methods, since the results of the quantum computer calculations essentially correspond to a predeterminable result only with a certain probability. The features presented here enable the respective other quantum computer, the second quantum computer (QC2), to evaluate whether the quantum operations of the other quantum computer, the first quantum computer (QC1), are running statistically correctly. This solves the problem that quantum computer calculation results only deliver values determined with a certain statistical probability. A deviation is not yet an error as long as the statistical distribution essentially corresponds to an expected distribution.

Feature 47: Quantum Computer System (QUSYS) According to One or More of the Features 43 to 46, wherein in the event of inferring an error, the second quantum computer (QC2) signals the occurrence of this error to the first quantum computer (QC1) or another quantum computer of the quantum computers (QC1 to QC16) of the quantum computer system (QUSYS) or a higher-level system (ZSE), and/or keeps information about this error available, for example in particular for them.

Advantage of this feature: the quantum computers (QC1 to QC16) of a quantum computer system (QUSYS) preferably monitor each other. This can mean, for example, that a first quantum computer (QC1) monitors a second quantum computer (QC2) and the second quantum computer (QC2) again monitors the first quantum computer (QC1). A quantum computer system used several times as an example in this document includes an exemplary number of 16 quantum computers (QC1 to QC16). Now, the first quantum computer (QC1) may monitor the second quantum computer (QC2). The second quantum computer (QC2) may monitor the third quantum computer (QC3) and so on. In this example, the fifteenth quantum computer (QC15) then preferably monitors the sixteenth quantum computer (QC16). In this example, the sixteenth quantum computer (QC16) monitors the first quantum computer (QC1). In this example, a central control device (ZSE) preferably monitors all sixteen quantum computers (QC1 to QC16), preferably in parallel.

Feature 48: Quantum Computer System (QUSYS) According to Feature 47, wherein the first quantum computer (QC1) is reset by the signaling of the second quantum computer (QC2) or is set in a predefined state or is set in one of a set of predefined states.

Advantage of this feature: if the second quantum computer (QC2) now monitors the first quantum computer (QC1), the second quantum computer (QC2) acts as a quantum computer monitoring device (QUV) of the first quantum computer (QC1). It is then useful that the second quantum computer (QC2) infers that there are errors in this first quantum computer (QC1) due to statistical evaluations of the behavior of the first quantum computer (QC1) if this statistical behavior indicates an error in the first quantum computer (QC1). A reset of the first quantum computer (QC1) by the second quantum computer (QC2) is then a particularly simple measure of the second quantum computer (QC2) for error correction/error containment.

Feature 49: Quantum Computer System (QUSYS) According to Feature 48, wherein the first quantum computer (QC1) in the event of a reset of the first quantum computer (QC1), in particular by signaling of a quantum computer monitoring device (QUV) or a higher-level central control unit (ZSE) or another quantum computer of the quantum computer (QC1 to QC16) of the quantum computer system (QUSYS), brings its quantum bits into a predetermined combination of superimposed quantum states.

Advantage of this feature: this feature describes in more detail what resetting a quantum computer, here the first quantum computer (QC1) as an example, means. In this context, the document presented here refers, for example, to the document WO 2021083448 A1. To the extent permitted by the law of any state in which the document presented here is to be nationalized, the technical teaching of WO 2021083448 A1 is fully incorporated in the disclosure of the document presented here. That document discloses a method for resetting the quantum dots for NV centers by irradiating with pump radiation and waiting for the relaxation time.

Feature 50: quantum computer system (QUSYS) according to one or more of features 45 to 49, wherein the first quantum computer (QC1) carries out a targeted error drive of the second quantum computer (QC2), in particular by transmitting an erroneous quantum computer calculation result from the first quantum computer (QC1) to the second quantum computer (QC2), when a malfunction recognizable by the first quantum computer (QC1) itself occurs to trigger a reset function originating from the second quantum computer (QC2).

Advantage of this feature: in some constructions, the first quantum computer (QC1) may not automatically trigger a complete reset of all or the essential sub-devices of the first quantum computer. However, the quantum computer monitoring device (QUV) correlated with it is preferably capable of exactly doing this. In the event that the first quantum computer (QC1) recognizes an error requiring a reset of all and/or at least the essential sub-devices of the first quantum computer (QC1), the first quantum computer (QC1) simulates an error with respect to the second quantum computer (QC2), whereupon this second quantum computer (QC2) recognizes such an error and triggers a reset of all and/or at least the essential sub-devices of the first quantum computer (QC1). Thus, the first quantum computer (QC1) ultimately be able to reset itself. Here, the second quantum computer (QC2) may perform further plausibility checks to prevent the first quantum computer (QC1) from accidentally resetting itself. This increases the barrier to self-reset of the first quantum computer (QC1).

Feature 51: quantum computer system (QUSYS) according to one or more of features 43 to 50.

wherein the second quantum computer (QC2) infers that there is an error if the first quantum computer (QC1) transmits a quantum computer calculation result from the first quantum computer (QC1) to the second quantum computer (QC2) before a predetermined second time point, wherein this predetermined second time point is chronologically after the predetermined time point or chronologically equal to the predetermined time point.

Advantage of this feature: quantum computers (QC) perform the quantum calculations within the so-called T2 time, in which it may be assumed that the probability that an entanglement and/or coherence of quantum states has not been lost, is very high. Therefore, quantum computers (QC) preferably perform quantum calculations in time slices. Here, each time slice preferably has a duration that is longer than 0s and shorter than the shortest T2 time of the quantum bits involved in the relevant quantum computer (QC). In a quantum computer (QC), these time slices for calculating quantum computer calculations are chronologically consecutive and do not overlap in time. Thus, a core ides of the technical teaching presented here is that the first quantum computer (QC) performs a quantum calculation as a utilization computation by means of a quantum computer program in a first time slice and signals to the second quantum computer (QC2) in a typically subsequent second time slice that it, the first quantum computer (QC1), is still functioning.

For example, the first quantum computer (QC1) may perform typically simple quantum computer calculations predetermined by the second quantum computer (QC2) in this second time slice, and signal the results of these predetermined quantum computer calculations in this second time slice to the second quantum computer (QC2). The second quantum computer (QC2) may perform statistics on the quantum computer calculation results of the first quantum computer (QC1) and infer that there is an error in the first quantum computer (QC1) if these results statistically deviate from result values statistically determined and expected for these quantum computer calculation results, for example, by the second quantum computer (QC2) more than a preset value. The second quantum computer (QC2), for example, may previously determine these result values itself by means of a quantum computer calculation. Sending a message too early may also indicate an error that may be detected in this way.

Feature 52: Quantum Computer System (QUSYS) According to One or More of Features 43 to 51,
   wherein the second quantum computer (QC2) infers that there is an error if the first quantum computer (QC1) transmits a quantum computer calculation result from the first quantum computer (QC1) to the second quantum computer (QC2) after a predetermined third time point,
   wherein this predetermined third time point is chronologically after the predetermined time point or is chronologically equal to the predetermined time point.
   Advantage of this feature: sending a message to the second quantum computer (QC2) by the first quantum computer (QC1) too late in time may also indicate an error that may be detected in this way. Other than that, the document presented here refers to the advantages of the preceding feature.

Feature 53: Quantum Computer System (QUSYS) According to One or More of Features 39 to 52,
   wherein the second quantum computer (QC2) signals to the first quantum computer (QC1) before the start of the predetermined second time period which predetermined quantum computer calculation or which predetermined quantum computer calculations the first quantum computer (QC1) should perform.
   Advantage of this feature: sending a message from the first quantum computer (QC1) to the second quantum computer (QC2) too early in time may also indicate an error in the first quantum computer (QC1), which may be detected in this way.

Feature 54: Quantum Computer System (QUSYS) According to One or More of Features 39 to 53,
   wherein the second quantum computer (QC2) signals to the quantum computer (QC) the temporal start and, if necessary, the temporal end or temporal duration of the predetermined second time period.
   Advantage of this feature: thus, the second quantum computer (QC2) may, for example, cause the first quantum computer (QC1) to take measures on its own if it does not respond to the request of the second quantum computer (QC2) in time. It is therefore expressly not absolutely necessary that the second quantum computer (QC2) initiates the measures. Rather, the control computer (μC1) of the first quantum computer (QC1) may also initiate a corresponding measure if the time to respond a request from the second quantum computer (QC2) has elapsed.

Feature 55: Quantum Computer System (QUSYS) According to One of the Preceding Features 39 to 54, Characterized in that,
   the error drive is caused by too frequent operation (drive) of the second quantum computer (QC2) by the first quantum computer (QC1).
   Advantage of this feature: for example, if the first quantum computer (QC1) sends the correct result of the quantum computer calculation too frequently, it may be, for example, a repetition of a stored result without actually performing the calculation a second time. Therefore, the second quantum computer (QC2) may also evaluate this behavior as a faulty behavior of the first quantum computer (QC1).

Feature 56: Quantum Computer System (QUSYS) According to One of the Preceding Features 39 to 55, Characterized in that,
   the first quantum computer (QC1) monitors for a malfunction in itself and/or in other components and/or sub-devices of the quantum computer system (QUSYS).
   Advantage of this feature: in particular, the control computer (μCD) of the first quantum computer (QC1) may operate as a quantum computer monitoring device (QUV) in a quantum computer system (QUSYS) for the second quantum computer (QC2) and/or for other quantum computers of the quantum computer (QC1 to QC16) of the quantum computer system (QUSYS). A plurality of quantum computers of the quantum computers (QC1 to QC16) of the quantum computer system (QUSYS) may monitor each other in this way. Here, each quantum computer of the quantum computers (QC1 to QC16) of the quantum computer system (QUSYS) acts at least temporarily as a quantum computer monitoring device (QUV) for another quantum computer of the quantum computers (QC1 to QC16) of the quantum computer system (QUSYS).

Feature 57: Quantum Computer System (QUSYS), in Particular According to One or More of the Preceding Features,
   with at least two quantum computers, a first quantum computer (QC1) and a second quantum computer (QC2),
   with a plurality of measuring devices for detecting operating variables of the quantum computer system (QUSYS) or a device or a system,
   wherein, the states of the device or the system might depend on the quantum computer system (QUSYS).
   wherein the first quantum computer (QC1) at least temporarily performs the same quantum calculation performed by the second quantum computer (QC2), and
   wherein the quantum computer calculation includes a monitoring measure to verify the functionality of the respective quantum computer (QC1, QC2),
   wherein the first quantum computer (QC1) performs the quantum computer calculation of the first quantum computer (QC1) independently of the quantum computer calculation of the second quantum computer (QC2).
   Advantage of this feature: the quantum computers (QC1, QC2) monitor each other. For this purpose, the quantum computer system (QUSYS) preferably comprises more than two quantum computers. The number of quantum computers in the quantum computer system (QUSYS) is preferably odd, so that there is always a majority for the correct quantum computer calculation result. As a result, a particularly safe quantum computer system (QUSYS) may be realized in space multiplex. Hardware defects in the quantum computer of a quantum computer system (QUSYS) are not recognizable in time-division multiplexing to reduce errors.

Feature 58: Quantum Computer System (QUSYS) According to Feature 57, Characterized in that, the first quantum computer (QC1) performs the monitoring measure and the second quantum computer (QC2) performs an equivalent monitoring measure corresponding to this monitoring measure in a simpler execution or following a different strategy on a redundant path.

Advantage of this feature: these measures exclude that systematic errors of the verification methodology, which causes the respective quantum computer of the quantum computers (QC1 to QC16) of the quantum computer system (QUSYS) in its role as quantum computer monitoring device (QUV) for the other quantum computer of the quantum computers (QC1 to QC16) of the quantum computer system (QUSYS) unable to detect an error of a quantum computer of the quantum computers (QC1 to QC16) of the quantum computer system (QUSYS).

Feature 59: Quantum Computer System (QUSYS) According to One of the Preceding Features 57 to 58, Characterized in that,
  the first quantum computer (QC1) carries out a monitoring measure based on the difference between a predeterminable or enterable set value and an actual value of a control loop of an adjusting element, while the second quantum computer (QC2) performs monitoring measures of a simpler type based on a plausibility comparison between the predeterminable or enterable set value, preferably the position of an operating element, and the position of the adjusting element.

Advantage of this feature: these measures exclude systematic errors of the verification methodology, which causes the respective quantum computer of the quantum computers (QC1 to QC16) of the quantum computer system (QUSYS) in its role as quantum computer monitoring device (QUV) for the other quantum computer of the quantum computers (QC1 to QC16) of the quantum computer system (QUSYS) unable to detect an error of a quantum computer of the quantum computers (QC1 to QC16) of the quantum computer system (QUSYS).

Feature 60: Quantum Computer System (QUSYS) According to One of the Preceding Features 57 to 59, Characterized in that,
  the quantum computers of the quantum computers (QC1 to QC16) of the quantum computer system (QUSYS) monitor each other by exchanging data via a data interface.

Advantage of this feature: in this way, the quantum computers of the quantum computers (QC1 to QC16) of the quantum computer system (QUSYS) may coordinate with each other in their roles as quantum computer monitoring devices (QUV) of other quantum computers of the quantum computers (QC1 to QC16) of the quantum computer system (QUSYS).

Feature 61: Quantum Computer System (QUSYS) According to One of the Preceding Features 57 to 61, Characterized in that,
  the quantum computer system comprises a first quantum computer (QC1) and a second quantum computer (QC2), and
  the first quantum computer (QC1) and the second quantum computer (QC2) have access to a driver stage for the adjusting element and, in the event of a recognized error, in the case of implausibilities with respect to the control loop and the position signals, switch off the driver stage independently of one another in accordance with the result of the monitoring measures correlated to them respectively or bring it into a safe state, and these quantum computer (QC1, QC2) inform each other in particular about the negative result of their monitoring.

Advantage of this feature: with this redundancy, the quantum computer system (QUSYS) prevents a single faulty quantum computer of the quantum computers (QC1 to QC16) of the quantum computer system (QUSYS) from being able to bring a safety-relevant control system into a non-safe state. For this purpose, two quantum computers (QC1, QC2) must have achieved a result with a preferably sufficient statistical probability that the activation of an unsafe system state appears to be indicated. Preferably, each of the quantum computers (QC1, QC2) activates an adjusting element correlated to this quantum computer respectively. The unsafe system state can only be activated or the unsafe system state is activated only if both adjusting elements are activated. Systems with more than two quantum computers and more than two adjusting elements are conceivable.

Feature 62: Quantum Computer System (QUSYS) According to One of the Preceding Features 57 to 61, Characterized in that,
  in the event of an error, the first quantum computer (QC1) intervenes in the energy supply of an application system or in the application system itself.

Advantage of this feature: in many cases, the safest method to prevent unsafe state is to
  a) interrupt the energy supply of the quantum computer system (QUSYS), and/or
  b) interrupt the energy supply of sub-devices of the quantum computer system (QUSYS), and/or
  c) interrupt the energy supply of relevant quantum computers of the quantum computers (QC1 to QC16) of the quantum computer system (QUSYS), and/or
  d) interrupt the power supply of sub-devices of the relevant quantum computers of the quantum computers (QC1 to QC16) of the quantum computer system (QUSYS) and/or
  e) interrupt the power supply of other devices controlled by them.

In principle, every system should be designed in such a way that a loss of energy supply leads to a safe state. However, in exceptional cases this may not be the case.

Feature 63: Quantum Computer System (QUSYS) According to One of the Preceding Features 57 to 62, Characterized in that,
  in the second quantum computer (QC2) plausibility checks are performed for switching on and off a regulator of the application system.

Advantage of this feature: even if the first quantum computer (QC1) works and has delivered a result, this result may still be outside an allowed range. Here, the criteria may be completely different than the criteria on which the quantum computer calculation was based. For example, a quantum computer calculation of the first quantum computer (QC1) could indicate that the application system controlling the first quantum computer (QC1) and/or the quantum computer system (QUSYS) should now apply 10 kV to a component as an electrical voltage. However, since the application system can only supply 50 V, it is useful if the control computer (µC2) of the second quantum computer (QC2) then limits the value to the realizable value. This applies in particularly to safety limits, which must be strictly observed, for example.

Feature 64: quantum computer system (QUSYS) according to one of the preceding features 57 to 63, characterized in that, the plausibility checks include at least one or more quantum computer calculations, which includes or include at least one manipulation of a quantum bit of the second quantum computer (QC2).

Advantage of this feature: for example, the second quantum computer (QUC2) may itself perform a quantum computer calculation to determine plausibility limits during the plausibility check by means of a quantum computer program. This is particularly advantageous if the plausibility check itself requires the solution of an NP-complete problem or makes it desirable.

Feature 65: method for monitoring the execution of a quantum computer program that can be executed on at least one control computer (μC) of a quantum computer (QC) by means of a quantum computer monitoring device (QUV) of the quantum computer (QC), wherein the quantum computer (QC) comprises quantum bits, the control computer (μC), first means for manipulating quantum bits of the quantum computer (QC) and second means for reading out the state of quantum bits of the quantum computer (QC), and wherein the first means for manipulating quantum bits of the quantum computer (QC) and the second means for reading out the state of quantum bits of the quantum computer (QC) are controlled by the control computer (μC), and wherein the quantum computer monitoring device (QUV) trigger an exception condition (Exception), in particular an interruption (Interrupt) of the quantum computer program flow, when a predetermined or determined subset of the quantum bits from the set of the quantum bits of the quantum computer (QC) is manipulated during the quantum computer program running time.

Advantage of this feature: preferably, predetermined quantum operations of the quantum computer (QC) should not affect all quantum bits. Typically, the quantum computers (QC1 to QC16) of the quantum computer system (QUSYS) include drive units as first means (M1), such as horizontal driver stages (e.g. reference signs HD1 to HD3 of FIG. 23 of WO 2021083448 A1) and/or the vertical driver stages (e.g. reference sign VD1 23 of WO 2021083448 A1), which drive the signal course on the control lines, for example horizontal control lines (e.g. references signs LH1 to LH3 of FIG. 23 of WO 2021083448 A1) and/or horizontal shield lines (e.g. references signs SH1 to SH4 of FIG. 23 of WO 2021083448 A1) and/or, for example, vertical control lines (e.g. reference signs LV1 of FIG. 23 of WO 2021083448 A1) and/or vertical shield lines (e.g. reference signs SV1 to SV2 of FIG. 23 of WO 2021083448 A1). Typically, the quantum computer (QC) includes evaluation units as second means (M2), such as horizontal receiver stages (e.g. reference signs HS1 to HS3 of FIG. 23 of WO 2021083448 A1) and/or the vertical receiver stages (e.g. reference signs VS1 of FIG. 23 of WO 2021083448 A1), which detect and evaluate the signal course on the control lines, for example horizontal control lines (e.g. reference signs LH1 to LH3 of FIG. 23 of WO 2021083448 A1) and/or horizontal shield lines (e.g. reference signs SH1 to SH4 of FIG. 23 of WO 2021083448 A1) and/or, for example, vertical control lines (e.g. reference signs LV1 of FIG. 23 of WO 2021083448 A1) and/or vertical shield lines (e.g. reference signs SV1 to SV2 of FIG. 23 of WO 2021083448 A1). The quantum computer monitoring device (QUV) may therefore observe these control means—first means M1—of the quantum computer (QC) by means of second means (M2) and infer the manipulation of the quantum bits of the quantum computer. The quantum computer monitoring device (QUV) may also observe the signaling of the control computer (μC) and thus its quantum computer program flow. If one or more of these signal courses lead to the assumption of access to one or more quantum bits that are not to be driven, the quantum computer monitoring device (QUV) may, in particular by means of such evaluation units, detect this and record it as an "assertion", i.e., an unauthorized access, or just as measured value etc. The quantum computer monitoring device (QUV) preferably verifies whether an exception condition (Exception) exists and preferably takes measures depending on the type of exception condition that is met. These measures may be of various types. The simplest is to reset the relevant quantum computer (QC). However, a measure may also be the reset of a single quantum bit or the said interruption of the quantum computer program flow or a forced change of the intended quantum computer program flow (branch) or a reset of the control computer (μC) of the quantum computer (QC). In this way, the quantum computer (QC), in cooperation with the quantum computer monitoring device (QUV), prevents such interference from leading to erroneous quantum computer calculation results, which the quantum computer system (QUSYS) then erroneously reuses. This prevents the further spread of the errors.

Feature 66: Method According to Feature 65, Characterized in that, the quantum computer monitoring device (QUV) trigger an exception condition (Exception), in particular an interruption (Interrupt) of the quantum computer program flow, when accessing a specific address range (AB) during the quantum computer program running time.

Advantage of the feature: in this way, the quantum computer (QC), in cooperation with the quantum computer monitoring device (QUV), prevents interference that led to erroneous access to the storage location of the quantum computer program in the memory of the control computer (μC) from leading to erroneous quantum computer calculation results, which the quantum computer system (QUSYS) then erroneously reuses. This prevents the further spread of the errors.

Feature 67: Method According to One or More of Features 65 to 66, Characterized in that, the control computer (μC) of the quantum computer (QC) goes through an exception condition routine (exception routine) after an exception condition has been triggered during the quantum computer program running time.

Advantage of this feature: as already mentioned above in feature 65, a forced branching of the quantum computer program is a possible measure, in the event of incorrect access to the memory and/or to quantum bits (QUB) of the quantum computer (QC) and/or to specially protected quantum bits (QUP) of the quantum bits (QUB) of the quantum computer (QC).

Feature 68: Method According to Feature 67, Characterized in that, the exception condition routine (exception routine) includes at least one quantum operation for manipulating at least one quantum bit of the quantum computer (QC).

Advantage of this feature: it is particularly advantageous if the disturbed quantum bit is brought into a predefined state by a predetermined sequence. In some cases, the calculation results of the other quantum bits may then be reused. However, this is not always the case. Another possible quantum operation is the re-initialization of all quantum bits of the quantum computer (QC) and a subsequent restart of the quantum program of the quantum computer (QC).

Feature 69: Method According to One or More of Features 65 to 68, Characterized in that, the quantum computer monitoring device (QUV) is configured by the control computer (µC) of the quantum computer (µC) or a central control unit (ZSE) or a control computer (µCL to µC16) of another quantum computer of quantum computers (QC1 to QC16) of the quantum computer system (QUSYS) or another computing system.

Advantage of this feature: the quantum computer system (QUSYS) is preferably designed in such a way that a quantum computer of the quantum computers (QC1 to Qc16) of the quantum computer system (QUSYS) may not configure the quantum computer monitoring device (QUV) correlated to it, in order to ensure that the quantum computers (QC1 to QC16) of the quantum computer system (QUSYS) cannot switch off their own quantum computer monitoring device (QUV) or render it ineffective or limit its effect or otherwise bypass it in the event of a malfunction. Therefore, it makes this less likely.

Feature 70: Method According to Feature 69, Characterized in that, the quantum computer monitoring device (QUV) is configured during startup of the quantum computer (QC).

Advantage of the feature: as a result, the correct execution of the quantum computer program by the respective quantum computer (QC) monitored by the respective quantum computer monitoring device (QUV) is ensured from the start.

Feature 71: Method According to One or More of Features 65 to 70, Characterized in that, the quantum computer (QC) is reset during the going-through of the exception routine, and
the quantum computer (QC) is restarted during the going-through of the exception routine, and
the monitored quantum computer program of the quantum computer (QC) is initialized during the going-through of the exception routine.

Advantage of the feature: for this purpose, this document refers to the examples above. Here, these are special measures of the quantum computer monitoring device (QUV).

Feature 72: Method According to Feature 71, Characterized in that, before resetting and restarting the quantum computer (QC) and before initializing the quantum computer program, at least the type of error state, in particular by the control computer (µC), is stored in an error memory, in particular within a memory (MEM) of the quantum computer (QC).

Advantage of the feature: this creation of a log file or similar data sets or information compilation enables an analysis of the occurring errors and facilitates troubleshooting.

Feature 73: Method According to Feature 72, Characterized in that, before resetting and restarting the quantum computer (QC) and before initializing the quantum computer program, the memory address that was accessed by the control computer (µC) before the error state occurred, in particular by the control computer (µC), is stored in the error memory, in particular within a memory (MEM) of the quantum computer (QC).

Advantage of the feature: this creation of a log file or similar data sets or information compilation enables an analysis of the occurring errors and facilitates troubleshooting.

Feature 74: Method According to One of Features 65 to 73, Characterized in that, the quantum computer monitoring device (QUV) monitors whether the quantum computer program accesses a predeterminable address range (AB) of a memory (MEM) of the quantum computer (QC) during the quantum computer program running time.

Advantage of the feature: in this way, the quantum computer (QC), in cooperation with the quantum computer monitoring device (QUV), prevents interference that led to incorrect access to the storage location of the quantum computer program in the memory of the control computer (µC) from leading to erroneous quantum computer calculation results, which the quantum computer system (QUSYS) then erroneously reuses. This prevents the further spread of the errors.

Feature 75: Method According to Feature 74, Characterized in that, the quantum computer monitoring device (QUV) monitors whether the quantum computer program accesses an address range (AB) of a stack of the quantum computer (QC) within a memory (MEM) of the quantum computer (QC) beyond a predeterminable maximum stack size, which can in particular correspond to a predeterminable address range (AB), during the quantum computer program running time.

Advantage of the feature: in this way, the quantum computer (QC), in cooperation with the quantum computer monitoring device (QUV), prevents interference that led to incorrect access to the storage location of the quantum computer program in the memory of the control computer (µC) from leading to erroneous quantum computer calculation results, which the quantum computer system (QUSYS) then erroneously reuses. This prevents the further spread of the errors.

Feature 76: Method According to One of Features 65 to 75, Characterized in that the quantum computer monitoring device (QUV) monitors whether the quantum computer program causes, during the quantum computer program running time, the control computer (µC) to manipulate a predeterminable subset of quantum bits of the quantum bits of the quantum computer (QC) through the first means using a quantum bit operation.

Advantage of this feature: the quantum computer monitoring device (QUV) may perform monitoring as described in connection with feature 65. However, the quantum computer monitoring device (QUV) may also monitor the communication and signaling of the control computer (µC) and check whether these correspond to expected values. For example, the quantum computer monitoring device (QUV) may be a clone of the control computer (µC), which tracks all steps of the control computer (µC) and works parallel to the control computer (µC). If there are differences in the signaling and in the communication, the quantum computer monitoring device (QUV) may then infer that the control computer (µC) and/or itself is in a potentially error state. If a signal course leads to access to a quantum bit of the quantum computer (QC) that should not be driven or is even a specially protected quantum bit (QUP), the quantum computer monitoring device (QUV) may recognize this as an "assertion", i.e., an unauthorized access. The quantum computer monitoring device (QUV) preferably verifies whether an exception condition (Exception) exists and preferably takes measures depending on the type of exception condition that is met. These measures may be of various types. The simplest is to reset the relevant quantum computer of the quantum computers (QC1 to QC16) of quantum computer system (QUSYS). However, a measure may also be the reset of a single quantum bit or the said interruption of the quantum computer program flow or a forced change of the intended quantum computer program flow (branch). In this way, the quantum computer (QC), in cooperation with the quantum computer monitoring device (QUV), prevents such interference from leading to erroneous quantum computer calculation results, which the quantum computer system (QUSYS) then erroneously reuses. This prevents the further spread of the errors.

Feature 77: Method According to Feature 76, Characterized in that, the quantum computer monitoring device (QUV) monitors whether the quantum computer program causes, during the quantum computer program running time, the control computer (µC) of the quantum computer (QC) to manipulate, by means of first means, quantum bits of the quantum computer (QC), which are not part of the predeterminable subset of quantum bits of the quantum bits of quantum computing (QC).

Advantage of this feature: the quantum computer monitoring device (QUV) may perform monitoring as described in connection with feature 65. However, the quantum computer monitoring device (QUV) may also monitor the communication and signaling of the control computer (µC) and check whether these correspond to expected values. For example, the quantum computer monitoring device (QUV) may be a clone of the control computer (µC), which tracks all steps of the control computer (µC) and works parallel to the control computer (µC). If there are differences in the signaling and in the communication, the quantum computer monitoring device (QUV) may then infer that the control computer (RC) and/or itself is in a potentially error state. If a signal course leads to access to quantum bit of the quantum computer (QC) that should not be driven and/or is a specially protected quantum bit (QUP), the quantum computer monitoring device (QUV) may recognize this as an "assertion", i.e., an unauthorized access. The quantum computer monitoring device (QUV) preferably verifies whether an exception condition (Exception) exists and preferably takes measures depending on the type of exception condition that is met. These measures may be of various types. The simplest is to reset the relevant quantum computer of the quantum computers (QC1 to QC16) of quantum computer system (QUSYS). However, a measure may also be the reset of a single quantum bit or the said interruption of the quantum computer program flow or a forced change of the intended quantum computer program flow (branch). In this way, the quantum computer (QC), in cooperation with the quantum computer monitoring device (QUV), prevents such interference from leading to erroneous quantum computer calculation results, which the quantum computer system (QUSYS) then erroneously reuses. This prevents the further spread of the errors.

Feature 78: method according to one of features 65 to 73, characterized in that, the quantum computer monitoring device (QUV) monitors whether, during the quantum computer program running time, an attempt is made, in particular by the control computer (µC), to execute a code sequence of the quantum computer program in the non-volatile memory (NVM), which is swapped from a non-volatile memory (NVM) of the quantum computer (QC) to a random-access memory (RAM) of the quantum computer (QC).

Advantage of this feature: the quantum computer monitoring device (QUV) may thus prevent the accidental start of such a code sequence or detect and report the omission of an intended start of such a code sequence. In this way ensures that the manipulation of the quantum bits of the quantum computer (QC) runs exactly as intended, even if the quantum computer (QC) is disturbed for whatever reason.

Feature 79: control element (NVM), in particular read-only memory or flash memory or non-volatile memory, for a quantum computer (QC), in particular of a control unit (SG) of a vehicle, wherein a quantum computer program is stored on the control element (NVM), which is executable on at least one control computer (µC) of the quantum compute (QC) and is suitable for executing a method according to one of the features 65 to 78.

Advantage of this feature: if this feature is present, it is not necessary to download the quantum computer program into the memory of the control computer (µC) via the data bus.

Feature 80: Quantum Computer (QC) with at Least One Control Computer (µC) and a Quantum Computer Monitoring Device (QUV), wherein a quantum computer program is executable on the at least one control computer (µC), and wherein the quantum computer monitoring device (QUV) monitors the execution of the quantum computer program during the quantum computer program running time, and wherein the quantum computer monitoring device (QUV) triggers an exception condition (Exception), in particular an interruption (Interrupt) of the quantum computer program flow, when the control computer (pC) accesses a specific address range (AB) within a memory (MEM) of the quantum computer (QC), Characterized in that, the control computer (µC) or a central control unit (ZSE) or another computer system configures the quantum computer monitoring device (QUV), and the quantum computer (QC) includes means for running an exception condition routine (exception routine) after an exception condition is triggered during the quantum computer program running time.

Advantage of this feature: the quantum computer monitoring device (QUV) may preferably drive a reset-logic or an interrupt-logic of the control computer (µC), which sets the program pointer and/or stack pointer of the control computer (µC) to predetermined values. Other effects of these means of the quantum computer monitoring device (QUV) and other means of the quantum computer monitoring device (QUV) for influencing the quantum computer program flow of the control computer (µC) are conceivable.

Feature 81: Quantum Computer (QC) According to Feature 80, Characterized in that, the quantum computer (QC) has other means for executing a method according to one of the features 75 to 78.

Advantages of this feature: by combining the features 65 to 78 and the feature 80, unintentional manipulation of quantum bits and/or the output of an incorrect quantum computer calculation result is unlikely. However, this does not reduce the natural error rate of quantum computer calculations.

Feature 82: Method for Operating a Quantum Computer System (QUSYS)

with a quantum computer (QC) and with a quantum computer monitoring device (QUV), Includes the Steps monitoring the correct quantum computer program flow of the quantum computer program of the quantum computer (QC), in particular by the quantum computer monitoring device (QUV), and performing predetermined quantum computer calculations with at least one quantum operation for calculating predetermined quantum computer calculation results in predetermined time periods before predetermined time points, in particular by the quantum computer (QC), and driving a quantum computer monitoring device (QUV) after these predetermined time points, in particular by the quantum computer (QC), and performing a reset (reset function), in particular of the quantum computer (QC) and/or in particular of sub-devices of the quantum computer (QC) to a quantum computer program start or the like when this drive is not carried out in a predetermined manner, in particular by the quantum computer (QC).

Advantage of this feature: if the quantum computer (QC) is disturbed for whatever reason, it, for example, delivers a result at the wrong time, an incorrect result or results with a result statistic that statistically deviates from an expected result statistic, etc. In this way, the quantum computer monitoring device (QUV) is able to recognize such hardware and software defects and malfunctions of the quantum computer (QC), report this to higher-level units, for example a central control unit (ZSE), and, if necessary, initiate countermeasures such as resetting all and/or individual sub-devices of the quantum computer (QC). After such a report, for example, the central control unit (ZSE) of a quantum computer system (QUSYS) may start the same quantum computer calculation on another, error-free quantum computer (QC) of the quantum computer system and, for example, shut down the faulty quantum computer (QC).

Feature 83: Method for Operating a Quantum Computer System (QUSYS) According to Feature 82 with the Step transmitting at least one result of a predetermined quantum computer calculation of the quantum computer (QC) to the quantum computer monitoring device (QUV) upon this drive.

Advantage of this feature: this transmission enables the quantum computer monitoring device (QUV) to perform a statistical investigation of whether the quantum computer calculation result statistics for these quantum computer calculations correspond to the expected quantum computer calculation result statistics. If this is not the case, the quantum computer monitoring device (QUV) may infer that there is an error and initiate the measures already described several times above and/or pass an error to a higher level unit, for example to a central control unit (ZSE) of a quantum computer system (QUSYS).

Feature 84: Method for Operating a Quantum Computer System (QUC) According to Feature 83 with the Step verifying the quantum computer calculation result of the predetermined quantum computer calculation of the quantum computer (QC) transmitted to the quantum computer monitoring device (QUV), in particular by the quantum computer (QC).

Advantage of this feature: the document presented here refers to the analogous advantages of the previous feature 83.

Feature 85: Method for Operating a Quantum Computer System (QUSYS) According to Feature 84 with the Step inferring an error state of the quantum computer (QC) if the quantum computer calculation result of the predetermined quantum computer calculation of the quantum computer (QC) is not within a predetermined allowed solution set for the quantum computer calculation result of the predetermined quantum computer calculation of the quantum computer (QC).

Advantage of this feature: the document presented here refers to the analogous advantages of the preceding feature 83.

Feature 86: Method for Operating a Quantum Computer System (QUSYS) According to Feature 84 or 85 with the Steps creating a statistic of a plurality of quantum computer calculation results of similar predetermined quantum computer calculations of the quantum computer (QC), which were transmitted to the quantum computer monitoring device (QUV) in particular by the quantum computer (QC), and inferring an error, in particular by the quantum computer monitoring device (QUV), wherein this inferring of an error is made if the quantum computer calculation results of the predetermined quantum computer calculations of the quantum computer (QC) with a first number deviate from an expected quantum computer calculation result of the quantum computer (QC) for these quantum computer calculations more frequently than a predetermined first maximum value.

Advantage of this feature: the document presented here refers to the analogous advantages of the previous feature 83.

Feature 87: Method According to Feature 86, wherein the count of the first number of deviations from the expected quantum computer calculation result of the quantum computer (QC) for these quantum computer calculations is reset again to a predetermined first starting value of this count value of this count, in particular to 0, if a second number of quantum computer calculation results of successive quantum computer calculations matches an expected quantum computer calculation result of the quantum computer (QC) for these quantum computer calculations in a predetermined manner more frequently than a predetermined second maximum value.

Advantage of this feature: the document presented here refers to the analogous advantages of the previous feature 83.

Feature 88: Method for Operating a Quantum Computer System (QUSYS) According to One or More of Features 85 to 87 with the Steps signaling of the occurrence of an error, in particular by the quantum computer monitoring device (QUV), to the quantum computer (QC) or to a higher-level system in the event of inferring an error, in particular by the quantum computer monitoring device (QUV), and/or providing of information about the occurrence of an error, in particular by the quantum computer monitoring device (QUV), in the event of inferring an error, in particular by the quantum computer monitoring device (QUV).

Advantage of this feature: the document presented here refers to the analogous advantages of the previous feature 83.

Feature 89: Method for Operating a Quantum Computer System (QUSYS) According to Feature 88 with the Step resetting the quantum computer (QC) and/or sub-devices of the quantum computer (QC) by the signaling, in particular of the quantum computer monitoring device (QUV).

Advantage of the feature: if an error occurs, the quantum computer (QC) is forced into a predefined new initial state, so that control over the quantum computer (QC) is reestablished.

Feature 90: Method for Operating a Quantum Computer System (QUSYS) According to Feature 89 with the Step
resetting the quantum computer (QC) by the signaling includes resetting the control computer (μC) of the quantum computer (QC).

Advantage of the feature: if an error occurs, the quantum computer (QC) is forced into a predefined new initial state, so that control over the quantum computer (QC) is reestablished.

Feature 91: Method for Operating a Quantum Computer System (QUSYS) According to One or More of Features 89 to 90,
wherein resetting the quantum computer (QC) by the signaling causes the quantum computer (QC) to bring at least part of the quantum bits of the quantum computer (QC) into a predetermined and/or predeterminable state and/or into a predetermined superposition of a plurality of predetermined states.

Advantage of the feature: if an error occurs, the quantum computer (QC) is forced into a predefined new quantum output state, so that control over the quantum dots of the quantum computer (QC) is reestablished.

Feature 92: Method for Operating a Quantum Computer System (QUSYS) According to One or More of Features 89 to 91.
wherein resetting the quantum computer (QC) by the signaling causes the quantum computer (QC) to perform at least one predetermined quantum computer calculation.

Advantage of the method: after resetting the quantum bits of the quantum register of the quantum computer (QC), the quantum bits of the quantum register of the quantum computer (QC) may be set to a more complicated intermediate state. For example, the quantum computer calculation performed up to the reset may be carried out again.

Feature 93 Method for Operating a Quantum Computer System (QUSYS) According to Feature 92,
wherein the quantum computer (QC) transmits the quantum computer calculation result of this quantum computer calculation to the quantum computer monitoring device (QUV).

Advantage of this feature: therefore, the quantum computer monitoring device (QUV) may perform statistics on the quantum computer calculation results of predefined quantum computer calculations and compare them with an expected statistical distribution for these quantum computer calculations and thus infer errors of the quantum computer (QC).

Feature 94: Method for Operating a Quantum Computer System (QUSYS) According to Feature 93,
wherein the quantum computer monitoring device (QUV) verifies the quantum computer calculation result of this quantum computer calculation of the quantum computer (QC).

Advantages of this feature: the advantages correspond to the advantages of feature 93.

Feature 95: Method for Operating a Quantum Computer System (QUSYS) According to One of More of Features 82 to 94 with the Step
manipulating quantum bits of the quantum computer (QC), in particular by the quantum computer (QC), in such a way
that these quantum bits of the quantum computer (QC) are set in a predetermined combination of superimposed quantum states in the event of a resetting the quantum computer, in particular by the quantum computer (QC).

Advantages of this feature: in the course of resetting the quantum bits (QUB) of the quantum register of the quantum computer (QC), the quantum computer monitoring device (QUV) may thus set a very specific quantum state of the quantum bits of the quantum register of the quantum computer (QC).

Feature 96: Method for Operating a Quantum Computer System (QUSYS) According to One or More of Features 82 to 95 with the Step
carrying out a targeted error drive of the quantum computer monitoring device (QUV), in particular by transmitting an incorrect quantum computer calculation result, in particular by the quantum computer (QC), in particular to the quantum computer monitoring device (QUV), when a malfunction of the quantum computer (QC) or its auxiliary units recognized by the quantum computer (QC) itself, in particular by its control computer (μC) or another auxiliary device of the quantum computer (QC), occurs to trigger a reset function originating from the quantum computer monitoring device (QUV).

Advantage of this feature: in some constructions, the quantum computer (QC) may not automatically trigger a complete reset of all or the essential sub-devices of the quantum computer (QC). However, the quantum computer monitoring device (QUV) correlated with it is preferably capable of exactly this. In the event that the quantum computer (QC) recognizes an error requiring a reset of all and/or at least the essential sub-devices of the quantum computer (QC), the quantum computer (QC) simulates an error relative to the quantum computer monitoring device (QUV), whereupon this quantum computer monitoring device (QUV) recognizes such an error and triggers a reset of all and/or at least the essential sub-devices of the quantum computer (QC). Thus, the quantum computer (QC) ultimately be able to reset itself. Here, the quantum computer monitoring device (QUV) may perform further plausibility checks to prevent the quantum computer (QC) from accidentally resetting itself.

Feature 97: Method for Operating a Quantum Computer System (QUSYS) According to Feature 96,
wherein the reset function originating from the quantum computer monitoring device (QUV) triggers a reset of the control computer (μC) of the quantum computer (QC).

Advantage of this feature: as a result, the quantum computer monitoring device (QUV) may bring the control computer (μC) of the quantum computer (QC) back into a defined state.

Feature 98: Method for Operating a Quantum Computer System (QUSYS) According to One or More of Features 96 to 97,
wherein the reset function originating from the quantum computer monitoring device (QUV) causes the quantum computer (QC) to bring at least part of the quantum bits of the quantum computer (QC) into a predetermined and/or predeterminable state and/or into a predetermined superposition of a plurality of predetermined states.

Advantage of this feature: as a result, the quantum computer monitoring device (QUV) may bring these parts of the quantum computer (QC) back into defined states.

Feature 99: Method for Operating a Quantum Computer System (QUSYS) According to One of More of Features 96 to 98, wherein the reset function originating from the quantum computer monitoring device (QUV) causes the quantum computer (QC) to perform at least one predetermined quantum computer calculation.

Advantage of this feature: as a result, the quantum computer monitoring device (QUV) may bring these quantum bits of the quantum register of the quantum computer (QC) back into defined quantum states.

Feature 100: Method for Operating a Quantum Computer System (QUSYS) According to Feature 99, wherein the quantum computer (µC) transmits the quantum computer calculation result of this quantum computer calculation to the quantum computer monitoring device (QUV).

Advantage of this feature: as a result, the quantum computer monitoring device (QUV) may verify whether the quantum bits of the quantum register of the quantum computer (QC) are in the set state when the quantum computer calculation is performed several times with the expected statistical distribution, and thus whether it is possible to bring the quantum bits of the quantum register of the quantum computer (QC) to the desired state.

Feature 101: Method for Operating a Quantum Computer System (QUSYS) According to Feature 100, wherein the quantum computer monitoring device (QUV) verifies the quantum computer calculation result of this quantum computer calculation of the quantum computer (QC).

Advantage of this feature: see advantage of feature 100.

Feature 102: Method for Operating a Quantum Computer System (QUSYS) According to One or More of Features 82 to 101 with the Step:

inferring an error, in particular by the quantum computer monitoring device (QUV), if the transmission of a quantum computer calculation result, in particular by the quantum computer (QC), and in particular to the quantum computer monitoring device (QUV), takes place before a predetermined second time point, wherein this predetermined second time point is after the predetermined time point or equal to the predetermined time point.

Advantage of the feature: if the quantum computer (QC) delivers a result earlier than expected for whatever reason, the quantum computer monitoring device (QUV) may assume a malfunction, since the quantum computer (QC) needs a predetermined time for special quantum operations and therefore cannot deliver the results before a predeterminable time period has elapsed. Such errors can thus be detected by this test.

Feature 103 Method for Operating a Quantum Computer System (QUSYS) According to One or More of Features 82 to 103 with the Step:

inferring an error, in particular by the quantum computer monitoring device (QUV), if the transmission of a quantum computer calculation result, in particular by the quantum computer (QC), and in particular to the quantum computer monitoring device (QUV), takes place after a predetermined third time point.

wherein this predetermined third time point is after the predetermined time point or equal to the predetermined time point.

Advantage of the feature: if the quantum computer (QC) delivers a result much later than expected for whatever reason, the quantum computer monitoring device (QUV) may assume a malfunction, since the quantum computer (QC) needs a predetermined time for special quantum operations and therefore should be able to deliver the result after a predeterminable time period has elapsed. If the quantum computer (QC) delivers the result much later, the control computer (µC) is prevented for whatever reason by unforeseen processes within the quantum computer (QC). In this case, it may be, for example, an excessively high interrupt load for the control computer (µC) due to malfunctions in the drive and/or readout devices for the quantum bits and/or other malfunctions in sub-devices of the quantum computer (QC). The quantum computer monitoring device (QUV) preferably starts a self-diagnosis of the sub-devices of the quantum computer (QC) and/or the quantum computer (QC) if such an error occurs repeatedly. Such errors can thus be detected by this test.

Feature 104: Method for Operating a Quantum Computer System (QUSYS) According to One or More of Features 82 to 103 with the Step signaling to the quantum computer, in particular by the quantum computer monitoring device (QUV), before the start of the predetermined time period, which predetermined quantum computer calculation or which predetermined quantum computer calculations the quantum computer (QC) should perform.

Advantage of this feature: as a result, the quantum computer monitoring device (QUV) may perform a verify of the quantum computer calculation functions of the quantum computer (QC) and verify individual quantum operations for functionality and effectiveness. Here, the quantum computer monitoring device (QUV) performs the evaluation based on statistics of a plurality of quantum computer calculation results, preferably of the same quantum computer calculations, since a single quantum computer calculation only delivers certain results with a certain probability respectively.

Feature 105: Method for Operating a Quantum Computer System (QUSYS) According to One or More of Features 82 to 104 with the Step signaling, in particular by the quantum computer monitoring device (QUV), of the time of the start of the predetermined time period and, if necessary, the time of the end of the predetermined time period or the duration of the predetermined time period to the quantum computer (QC).

Advantage of this feature: the quantum computer monitoring device (QUV) may, for example, cause the quantum computer (QC) to take measures on its own if it does not respond to the request from the quantum computer monitoring device (QUV) in time. It is therefore expressly not absolutely necessary for the quantum computer monitoring device (QUV) to initiate the measures. Rather, the control computer (µC) of the quantum computer (QC) may also initiate a corresponding measure if the time to response a request from the quantum computer monitoring device (QUV) has elapsed.

Feature 106: Method for Operating a Quantum Computer System (QUSYS) According to One or More of Features 82 to 105, with the Step inferring an error, in particular by the quantum computer monitoring device (QUV), if the quantum computer monitoring device (QUV) is driven, in particular by the quantum computer (QC), too frequently, in particular more frequently than an expected drive value within an additional time period.

Advantage of this feature: as a result, the quantum computer monitoring device (QUV) may recognize malfunctions of the quantum computer (QC) and/or sub-devices of the quantum computer (QC).

Feature 107: Method for Operating a Quantum Computer System (QUSYS) According to One or More of Features 82 to 106, with the Step

- monitoring the quantum computer (QC) for a malfunction of the quantum computer (QC) by the quantum computer (QC) itself, and/or
- monitoring for malfunction of other components and/or functional elements of the quantum computer system (QUSYS) by the quantum computer (QC), and/or
- monitoring for a malfunction of quantum computer system components by the quantum computer (QC) itself.

Advantage of this feature: in particular, the control computer ($\mu$C) of a quantum computer (QC) may operate as a quantum computer monitoring device (QUV) for this quantum computer (QC) and/or for another quantum computer (QC) of the quantum computers (QC1 to QC16) in a quantum computer system (QUSYS). In this way, a plurality of quantum computers (QC1 to QC16) of a quantum computer system (QUSYS) may monitor each other. Here, each quantum computer (QC) of the quantum computers (QC1 to QC16) of the quantum computer system (QUSYS) acts at least temporarily as a quantum computer monitoring device (QUV) for another quantum computer (QC) of the quantum computers (QC1 to QC16) of the quantum computer system (QUSYS).

Feature 108: method for monitoring the correct quantum computer program flow of #quantum computer system (QUSYS) provided with a quantum computer monitoring device (QUV), in particular using a method according to one or more of features 82 to 107,

- wherein the quantum computer system (QUSYS) comprises a quantum computer (QC), and
- wherein the quantum computer (QC) drives the quantum computer monitoring device (QUV) at specific time intervals, in particular via a data bus (DB) by means of a message, and
- wherein the quantum computer monitoring device (QUV) triggers a reset (reset function) of the quantum computer (QC) without this drive.

Advantage of this feature: as a result, the quantum computer monitoring device (QUV) may bring the quantum computer (QC) back into a defined state.

Feature 109: Method According to Feature 108,

- wherein the reset causes the control computer ($\mu$C) of the quantum computer (QC1 to jump to the quantum computer program start or another predetermined program point of the quantum computer program.

Advantage of this feature: as a result, the quantum computer monitoring device (QUV) may bring the control computer ($\mu$C') of the quantum computer (QC) back into a defined state.

Feature 110: Method According to One or More of Features 108 to 109,

- wherein the reset causes the control computer ($\mu$C) of the quantum computer (QC1 to bring at least part of quantum bits of the quantum computer (QC) into a predefined or predefinable quantum state or into a predefined or predefinable superposition of such quantum states.

wherein these quantum bits include at least part of the quantum bits of the quantum computer (QC).

Advantage of this feature: as a result, the quantum computer monitoring device (QUV) may bring the quantum bits of the quantum register of the quantum computer (QC) and/or a part of the quantum bits of the quantum register of the quantum computer (QC) back into a defined quantum state.

Feature 111: Method According to One or More of Features 108 to 110, Characterized in that,

- the quantum computer (QC) carries out a targeted error drive of the quantum computer monitoring device (QUV) when a malfunction recognized by the quantum computer (QC) occurs to trigger a reset function originating from the quantum computer monitoring device (QUV).

Advantage of this feature: in some constructions, the quantum computer (QC) may not automatically trigger a complete reset of all or the essential sub-devices of the quantum computer (QC). However, the quantum computer monitoring device (QUV) correlated with it is preferably capable of exactly this. In the event that the quantum computer (QC) recognizes an error requiring a reset of all and/or at least the essential sub-devices of the quantum computer (QC), the quantum computer (QC) simulates an error relative to the quantum computer monitoring device (QUV). Whereupon this quantum computer monitoring device (QUV) recognizes such an error and triggers a reset of all and/or at least the essential sub-devices of the quantum computer (QC). Thus, the quantum computer (QC) ultimately be able to reset itself. Here, the quantum computer monitoring device (QUV) may perform further plausibility checks to prevent the quantum computer (QC) from accidentally resetting itself.

LIST OF REFERENCE SYMBOLS

AB predetermined, specially protected address range within the memory (MEM) of the quantum computer (QC);

BPL bypass line;

DB data bus;

GR device controlled or regulated by the Quantum Computer (QC);

GSTL device control lines via which the quantum computer (QC) controls or regulates the device (GR). The device control lines preferably include lines that transmit control commands and/or control signals from the quantum computer (QC) to the device (GR), and/or lines that transmit data and/or measured value signals from the device (GR) to the quantum computer (QC). Device control lines may also be bidirectional and/or analog and/or digital and/or differential and/or with voltage-controlled and/or current-controlled signaling;

ICLK internal clock generator of the quantum computer monitoring device (QUV);

iCLK internal clock of the quantum computer monitoring device (QUV). The internal clock generator of the quantum computer monitoring device (QUV) generates the internal clock of the quantum computer monitoring device (QUV), which preferentially drives the logic parts of the quantum computer monitoring device (QUV);

iCNTS internal counter event signal;

INTR interrupt line;

ITR signaling line of the quantum computer monitoring device (QUV). With this signaling line, the quantum computer monitoring device preferably signals the central control unit (ZSE) that a reset of the quantum computer system (QUSYS) or individual or multiple quantum computers (QC1 to QC16) of the quantum computer system (QUSYS) is required. In the simplest case it is a reset or interrupt line of the computer of the central control unit (ZSE). The signaling line may be a data bus or the like via which the quantum computer monitoring device (QUV) may transmit states of the quantum computer system (QUSYS) to the central control device (ZSE) and/or request measures to reduce, eliminate or prevent errors of the quantum computer system (QUSYS);

μC control computer of the quantum computer (QC);

μC1 first control computer of the first quantum computer (QC1);

μC2 second control computer of the second quantum computer (QC2);

μC3 third control computer of the third quantum computer (QC3);

μC4 fourth control computer of the fourth quantum computer (QC4);

μC5 fifth control computer of the fifth quantum computer (QC5),

μC6 sixth control computer of the sixth quantum computer (QC6);

μC7 seventh control computer of the seventh quantum computer (QC7);

μC8 eighth control computer of the eighth quantum computer (QC8);

μC9 ninth control computer of the ninth quantum computer (QC9);

μC10 tenth control computer of the tenth quantum computer (QC10);

μC11 eleventh control computer of the eleventh quantum computer (QC11);

μC12 twelfth control computer of the twelfth quantum computer (QC12);

μC13 thirteenth control computer of the thirteenth quantum computer (QC13);

μC14 fourteenth control computer of the fourteenth quantum computer (QC14);

μC15 fifteenth control computer of the fifteenth quantum computer (QC15);

μC16 sixteenth control computer of the sixteenth quantum computer (QC16);

μCQUV control computer of the quantum computer monitoring device (QUV). If the quantum computer monitoring device (QUV) itself is a quantum computer (QC), it may be the control computer (μC) of this quantum computer;

M1 first means of the quantum computer (QC) for manipulating the quantum bits (QUB) of the quantum computer (QC). The control computer (μC) of the quantum computer (QC) preferably controls the first means and reads out their operating state values via the data bus (QCDB) of the quantum computer (QC);

M2 second means of the quantum computer (QC) for reading out the quantum states of the quantum bits (QUB) of the quantum computer (QC). The control computer (μC) of the quantum computer (QC) preferably controls the second means and reads out their operating state values and measured values and the determined quantum state values of the quantum bits (QUB) via the data bus (QCDB) of the quantum computer (QC);

MEM memory of the control computer (μC) of the quantum computer (QC);

NVM non-volatile memory;

QC quantum computers. It may be a quantum computer of the quantum computers (QC1 to QC16) of the quantum computer system (QUSYS). It is preferably a quantum computer with paramagnetic centers as quantum bits of the quantum computer. These paramagnetic centers preferably include NV centers and/or SiV centers and/or TR1 centers and/or L1 centers and/or TIV centers and/or GeV centers and/or SnV centers and/or $NiN_4$ centers and/or PbV centers and/or ST1 centers etc. Very particularly preferably, these paramagnetic centers essentially comprise NV centers. The quantum computer is preferably a room temperature quantum computer without cooling for operation at an ambient temperature above 0° C.;

QC1 first quantum computer of the exemplary quantum computer system (QUSYS);

QC2 second quantum computer of the exemplary quantum computer system (QUSYS);

QC3 third quantum computer of the exemplary quantum computer system (QUSYS);

QC4 fourth quantum computer of the exemplary quantum computer system (QUSYS);

QC5 fifth quantum computer of the exemplary quantum computer system (QUSYS);

QC6 sixth quantum computer of the exemplary quantum computer sys (QUSYS);

QC7 seventh quantum computer of the exemplary quantum computer system (QUSYS);

QC8 eighth quantum computer of the exemplary quantum computer system (QUSYS);

QC9 ninth quantum computer of the exemplary quantum computer system (QUSYS);

QC10 tenth quantum computer of the exemplary quantum computer system (QUSYS);

QC11 eleventh quantum computer of the exemplary quantum computer system (QUSYS);

QC12 twelfth quantum computer of the exemplary quantum computer system (QUSYS);

QC13 thirteenth quantum computer of the exemplary quantum computer system (QUSYS);

QC14 fourteenth quantum computer of the exemplary quantum computer system (QUSYS);

QC15 fifteenth quantum computer of the exemplary quantum computer system (QUSYS);

QC16 sixteenth quantum computer of the exemplary quantum computer system (QUSYS), QCDB internal data bus of the quantum computer (QC);

QUB quantum bits;

QUP specially protected quantum bits (QUB) among the quantum bits (QUB) of the quantum computer (QC). A quantum computer (QC) does not always need to have specially protected quantum bits. The control computer (μC) or another authorized computer preferably protects such specially protected quantum bits by setting one or more flags or similar information, which are preferably located in the quantum computer monitoring device (QUV). Before a desired manipulation of specially protected quantum bits, the control computer (μC) of the quantum computer (QC) or another authorized computer deletes these flags. After the quantum computer calculation using these specially protected quantum bits (QUP), the control computer (μC) of the quantum computer (QC) or another authorized computer preferably sets these flags again and thus restores the protection. Preferably, changing these flags requires a password to be transmitted to a register that allows the flags to be changed if the password in the register matches a predetermined value;

QUSYS quantum computing system;

QUV quantum computer monitoring device. The quantum computer monitoring device may monitor the central control unit (ZSE) and the quantum computers (QC1 to QC16) of the quantum computer system (QUSYS) as part of a quantum computer system (QUSYS), and/or monitor the control computer (µC) of the quantum computer (QC) and other sub-devices of the quantum computer (QC) as part of a quantum computer (QC). These sub-devices preferably include the quantum bits and their drive and readout devices and devices for manipulating the quantum bits of the quantum computer (QC), etc.

RAM read/write memory of the control computer (µC) of the quantum computer (QC);

SdT state of the art;

SYSC system component;

SYSCDB exemplary other signal lines that may include a data bus;

TERM terminal. In the example in FIG. 4, the terminal serves as a central control unit (ZSE);

ZSE central control unit of the quantum computing system (QUSYS);

What is claimed is:

1. A Quantum Computer System:
   wherein the quantum computer system comprises a quantum computer, and
   wherein the quantum computer comprises a control computer, and
   wherein the quantum computer comprises one or more quantum bits, and
   wherein said quantum computer comprises first means comprising one or more electrical lines configured to manipulate quantum states of the one or more quantum bits by magnetic, electrical and/or electromagnetic fields, the first means adapted to,
      create and/or manipulate a superposition of quantum states of one or more quantum bits of the quantum computer, and/or
      set a predetermined quantum state of one or more quantum bits of the quantum computer, and/or
      adjust a predetermined superposition of several predetermined quantum states of one or more quantum bits of the quantum computer, and/or
      set a predetermined entanglement of multiple predetermined quantum states of one or more quantum bits of the quantum computer, and
   wherein the quantum computer comprises receiver stages arranged to determine and/or read out a quantum state of one or more quantum bits of the quantum computer, and
   wherein the quantum computer system comprises, in addition to the control computer of the quantum computer, a quantum computer monitoring device, adapted to monitor the quantum computer, and
   wherein the quantum computer monitoring device is adapted to monitor for malfunction of quantum computer system components, and
   wherein the quantum computer is adapted to execute a quantum computer program having a quantum computer program flow; and
   wherein the quantum computer monitoring device is adapted to monitor a correct quantum computer program flow of the quantum computer program of the quantum computer, and
   wherein the quantum computer monitoring device is configured to monitor a correct quantum computer program flow of the quantum computer program of the quantum computer,
   whereby the monitoring of a correct program flow means a prevention of unauthorized and possibly dangerous states of systems controlled by the quantum computer, and
   wherein the quantum computer monitoring device is arranged to prevent unauthorized and possibly dangerous states of said systems controlled by the quantum computer, and
   wherein monitoring correct program operation means that quantum computer monitoring device is arranged to detect quantum computer errors that occur during operation,
      wherein these faults to be detected include hardware and/or software defects and/or malfunctions of the quantum computer, and
      wherein A) the quantum computer monitoring device is adapted, in an event of the quantum computer monitoring device concluding that an error has occurred, to
         i. a device connected to the quantum computer:
            a. to block its function for a specified period of time, or
            b. to bring it into a safe condition or
            c. prevent the quantum computer from accessing the device or
            d. connect the device to a quantum computer simulation device instead of the quantum computer and/or
         ii. signaling to the quantum computer or to a higher-level system an occurrence of said error or providing information about said error and wherein said signaling to the quantum computer monitoring device has a consequence that said signaling is
            e. resets the quantum computer and/or
            f. brings the quantum computer into a predetermined state and/or
            g. brings at least one quantum bit of the quantum computer into a predetermined state and/or
            h. brings at least one nuclear quantum bit of the quantum computer into a predetermined state and/or,
            i. brings at least one quantum register of the quantum computer into a predetermined state and/or
            j. brings at least one nuclear quantum register of the quantum computer into a predetermined state and/or
            k. brings at least one nuklear electron quantum register of the quantum computer into a predetermined state, and/or
      wherein B) the quantum computer monitoring device is adapted, when it concludes that the quantum computer is faulty or in an erroneous state, to perform one or more of following countermeasures:
         i. Perform predetermined quantum computing calculations to test the quantum computer; and/or
         ii. Decommissioning of the quantum computer in question and/or iii. Replacing the quantum computer with a quantum computer simulation device to provide an emergency run, and/or
iv. to signal a fault to a superordinate unit and/or to a user and/or
v. Putting the quantum computer system in an emergency state.

2. The quantum computer system according to claim 1, wherein the quantum computer monitoring device is arranged to monitor at least a value and/or value progression of one of following operating parameters and to detect for this purpose:
   a value of an operating voltage of an operating voltage line of the quantum computer system with respect to a reference potential and/or
   a value of a current consumption of the quantum computer system associated with this operating voltage line and/or
   a value of an operating voltage of an operating voltage line of the quantum computer with respect to a reference potential and/or
   a value of a current consumption of the quantum computer associated with this operating voltage and/or
   a value of an operating voltage of a device part of the quantum computer with respect to a reference potential and/or
   a value of a current consumption associated with an operating voltage of a device part of the quantum computer and/or
   a processor clock of a control computer, which may be part of the quantum computer, and/or
   the value of a frequency of the processor clock of the control computer, which may be part of the quantum computer, and/or
   a light emission of a light source of a quantum computer for irradiating quantum bits of the quantum computer with radiation and/or
   a detection capability of electromagnetic radiation of a photodetector and/or
   an intended correct generation of electromagnetic fields, in particular of microwave fields and/or radio wave fields a device of the quantum computer for manipulating one or more quantum bits and/or
   a complex and/or real and/or imaginary conductance of a line that is part of a quantum computing device for manipulating one or more quantum bits, and
wherein the quantum computer monitoring device is arranged to determine measured values for the monitored operating parameters, and
wherein the quantum computer monitoring device is arranged to compare said measured values with threshold values and/or predetermined tolerance intervals for said measured values of said operating parameters, and
wherein the quantum computer monitoring device is set up to initiate countermeasures if the measured values lie outside value ranges marked as permissible by the threshold values and/or the predetermined tolerance intervals.

3. The Quantum computer system according to claim 1, whereas the quantum computer system has at least two quantum computers, the quantum computer, now called a first quantum computer, and a second quantum computer, and
wherein a signaling, of a quantum computer calculation result, can take place from the first quantum computer to the second quantum computer via at least one signal connection, and
wherein the second quantum computer is adapted to operate, at least temporarily, as a quantum computer monitoring device of the first quantum computer, and
wherein second quantum computer is adapted to infer an error condition of the first quantum computer when the quantum computer calculation result of the first quantum computer is not within a predetermined allowed solution set for the quantum computer calculation result of the first quantum computer, and
wherein the second quantum computer is arranged to signal the occurrence of a fault to the first quantum computer or to a higher-level system and/or to hold information about this fault in case of conclusion.

4. The quantum computer system according to claim 3, wherein the quantum computer system has at least two quantum computers, the quantum computer, now called the first quantum computer, and
a second quantum computer, and
wherein the quantum computer system comprises more than exactly one measuring devices for detecting operational quantities of the quantum computer system and/or for detecting operational quantities of a device or and/or for detecting operational quantities of a system, and
wherein, if applicable, the states of this device depend on the quantum computer system, or wherein, if applicable, the states of this system depend on the quantum computer system, and
whereby the first quantum computer performs a first quantum computer computation, and
wherein the second quantum computer also performs this first quantum computer computation at least intermittently and/or with a time delay, and
wherein the first quantum computer computation, when executed by the first quantum computer, comprises a monitoring measure for verifying an operability of the first quantum computer, and
wherein the first quantum computer computation, when executed by the second quantum computer, comprises a monitoring measure for verifying an operability of the second quantum computer, and
wherein the first quantum computer performs the quantum computing of the first quantum computer independently of the quantum computing of the second quantum computer, and
wherein an expected value is the quantum computing result of the quantum computing of the second quantum computer, and
wherein the second quantum computer is arranged to operate at least temporarily as a quantum computer monitoring device of the first quantum computer, and
wherein the second quantum computer is arranged to have the predetermined quantum computer computation performed by the first quantum computer a plurality of times and to compare respective frequencies of the expected quantum computer computation results with respective expected values for the quantum computer computation results actually transmitted from the first quantum computer to the second quantum computer, and
wherein the second quantum computer is arranged to infer an error if that respective frequency of quantum computer computation results actually transmitted from the first quantum computer to the second quantum computer deviates from the respective expected values for the respective frequency of expected quantum computer computation results at one or more expected values by more than a respective expected value deviation tolerance.

5. The quantum computer system according to claim 1,
whereby the quantum computer comprises
   quantum bits and
   a control computer and
   first means comprising one or more electrical lines configured to manipulate the quantum states of the quantum bits by magnetic, electrical and/or electromagnetic fields for manipulating quantum bits of the quantum computer and
   receiver stages for reading out the state of quantum bits of the quantum computer, and
wherein the first means comprising the one or more electrical lines configured to manipulate the quantum states of the quantum bits by magnetic, electrical and/or electromagnetic fields for manipulating quantum bits of the quantum computer are controlled by the control computer, and
wherein the receiver stages for reading out the state of quantum bits of the quantum computer are controlled by the control computer, and
wherein the quantum computer monitoring device is programmed to monitor the quantum computer program execution of a quantum computer program executable on the control computer of the quantum computer, and
wherein said quantum computer monitoring device monitors said quantum computer program execution of said quantum computer program executable on at least said control computer of said quantum computer, and
whereas upon manipulation of a subset of the quantum bits of the quantum computer quantum bits during a quantum computer program runtime the quantum computer monitoring device raises an exception, in a form of an interruption (interrupt) of the quantum computer program run, or other action depending on a type of exception condition met.

6. The quantum computer system according to claim 1,
whereas, the quantum computer comprises a read-only memory or a flash memory or other non-volatile memory, and,
wherein the read-only memory or the flash memory or the other non-volatile memory has stored thereon a quantum computer program executable on at least the control computer of the quantum computer.

7. The quantum computer system according to claim 1,
wherein the quantum computer system comprises a quantum computer having at least a control computer and the quantum computer monitoring device,
wherein a quantum computer program is executable on the at least one control computer, and
wherein the quantum computer monitoring device monitors running of the quantum computer program during a quantum computer program runtime and triggers an exception condition (Exception), in particular an interruption (Interrupt) of the quantum computer program run, when a certain address area (AB) within a memory (MEM) of the quantum computer is accessed,
wherein
the quantum computer comprises a reset logic and/or an interrupt logic of the control computer for running an exception routine after an exception condition is raised during the quantum computer program runtime, by setting a program pointer and/or stack pointer of the control computer to predetermined values.

8. A method of operating a quantum computer system,
wherein the quantum computer system comprises a quantum computer, and
   vi. wherein the quantum computer comprises a control computer, and
   vii. wherein the quantum computer comprises one or more quantum bits, and
   viii. wherein the quantum computer comprises first means comprising one or more electrical lines configured to manipulate quantum states of the one or more quantum bits by magnetic, electrical and/or electromagnetic fields, the first means adapted to,
      l. Create and/or manipulate a superposition of quantum states of one or more quantum bits of the quantum computer and/or
      m. set a predetermined quantum state of one or more quantum bits of the quantum computer and/or
      n. set a predetermined superposition of several predetermined quantum states of one or more quantum bits of the quantum computer and/or
      o. to set a predetermined entanglement of a plurality of predetermined quantum states of one or more quantum bits of the quantum computer, and
   ix. wherein the quantum computer comprises receiver stages arranged to detect and/or read out a quantum state of one or more quantum bits of the quantum computer, and
wherein the quantum computer system comprises, in addition to the control computer of the quantum computer, a quantum computer monitoring device adapted to monitor the quantum computer, and
wherein the quantum computer monitoring device is adapted to monitor for malfunction of quantum computer system components, and
wherein the quantum computer is arranged to execute a quantum computer program having a quantum computer program flow, and
wherein the quantum computer monitoring device is arranged to monitor a correct quantum computer program flow of the quantum computer program of the quantum computer, and
wherein the quantum computer monitoring device is configured to monitor the correct quantum computer program execution of the quantum computer program of the quantum computer, and
wherein the quantum computer monitoring device is arranged to prevent unauthorized and possibly dangerous states of these systems controlled by the quantum computer,
the method comprising:
monitoring the correct quantum computer program flow of the quantum computer program of the quantum computer by the quantum computer monitoring device,
wherein monitoring proper program operation means preventing unauthorized and possibly dangerous states of systems controlled by the quantum computer, and
where monitoring proper program flow also means detecting errors in the quantum systems of the quantum computer that may occur during operation, and
the errors to be detected comprising hardware and/or software defects and/or malfunctions of the quantum computer, and
performing predetermined quantum computer computations using at least one quantum operation to compute predetermined quantum computer computation results at predetermined time periods before predetermined time points, by the quantum computer, and driving the quantum computer monitoring device after these predetermined times and performing a reset function of the quantum computer to a predetermined or preset quantum computer program start state when this driving of the quantum computer monitoring device is not performed in a predetermined manner.

* * * * *